(12) United States Patent
Arisaka

(10) Patent No.: US 6,511,273 B2
(45) Date of Patent: Jan. 28, 2003

(54) CLIP FOR HOLDING TWO OR MORE SHEET-LIKE MATERIALS TOGETHER

(75) Inventor: Oomi Arisaka, Yokohama (JP)

(73) Assignee: Piolax, Inc., Kanagawa-Ken (JP)

( * ) Notice: Subject to any disclaimer, the term of this patent is extended or adjusted under 35 U.S.C. 154(b) by 0 days.

(21) Appl. No.: 09/809,898

(22) Filed: Mar. 16, 2001

(65) Prior Publication Data

US 2001/0022923 A1 Sep. 20, 2001

(30) Foreign Application Priority Data

Mar. 17, 2000 (JP) ........................................ 2000-077052
Sep. 28, 2000 (JP) ........................................ 2000-297505

(51) Int. Cl.[7] .............................................. F16B 13/06
(52) U.S. Cl. ........................... 411/48; 411/41; 411/344; 411/908
(58) Field of Search ............................. 411/41, 45, 46, 411/48, 340, 344, 908

(56) References Cited

U.S. PATENT DOCUMENTS 4,312,614 A * 1/1982 Palmer et al. ............ 411/41 X
4,571,134 A * 2/1986 Beglinger et al. ............ 411/41
5,028,187 A * 7/1991 Sato ............................. 411/48
5,165,833 A   11/1992 Watanabe et al. ........... 411/508

FOREIGN PATENT DOCUMENTS

| EP | 0415509 B1 | 3/1991  | ............. F16B/5/06  |
| EP | 0735285 A1 | 10/1996 | ........... F16B/19/10 |
| JP | 2796850    | 4/1991  | ........... F16B/19/10 |

OTHER PUBLICATIONS

Search Report.

* cited by examiner

*Primary Examiner*—Neill Wilson
(74) *Attorney, Agent, or Firm*—Howard & Howard

(57) ABSTRACT

A clip is used to hold two or more sheet-like materials, for example, an automobile panel and a trim, together. The clip comprises a grommet having a V-shaped leg portion, a pin movable in the axial direction in a space between the V-shaped leg, and a pair of hinges coupling the pin with the V-shaped leg portion of the grommet. The V-shaped leg has a pair of leg pieces and a bottom connecting the leg pieces. The hinges are curved in the free state, and extend in planes perpendicular to the plane defined by the longitudinal axes of the leg pieces of the V-shaped leg.

19 Claims, 33 Drawing Sheets

CLIP FOR HOLDING TWO OR MORE SHEET-LIKE MATERIALS TOGETHER

The present patent application claims the benefit of earlier Japanese Patent Application Nos. 2000-77052 and 2000-297505 filed Mar. 17, 2000 and Sep. 28, 2000, respectively, the disclosures of which are incorporated herein by reference.

BACKGROUND OF THE INVENTION

1. Field of the Invention

The present invention relates to a clip for tightly holding two or more sheet-like materials, such as an automobile body panel and an interior trim. More specifically, the invention relates to a clip, in which a grommet and a pin are coupled via hinges into a single unit, thereby greatly reducing forces required to push the grommet and the pin into a hole.

2. Description of the Related Art

A conventional single-unit clip used to hold two panels or the like is disclosed by, for example, Japanese Patent No. 2796850. FIG. 1 illustrates the conventional clip, which is inserted into a hole (not shown) formed in an automobile panel to hold a trim or a liner against the panel. The inserted clip catches the edges of the hole, thereby securely holding two materials together.

The conventional clip 1 illustrated in FIG. 1 includes a grommet 2 having a V-shaped cross-section in the free state, a pin 3 placed in the grommet 2 and movable in the axial direction, and a pair of hinges for coupling the pin 3 with the grommet 2. The hinges 5 extend from the tip of the pin 3 obliquely downward to the V-shaped elastic leg 6 of the grommet 2 so as to have an inverse V-shaped cross-sectional view before the clip is inserted in the hole.

When inserting the clip 1 into the hole, the side of the grommet 2 is held between fingers and pressed inward so that the grommet 2 is easily inserted in the hole. After the insertion, the grommet 2 expands in the radial direction by its own elastic force and returns to its original states. As a result, the barrel 7 of the grommet 2, which is made thicker than the leg 6, comes into tight contact with the edges of the hole for receiving the clip. Then, the head 8 of the pin 3 is depressed in the direction of the arrow, and the spindle 4 of the pin 3 is inserted into the valley of the V-shaped elastic leg 6 against the elastic force of the hinges 5.

If the pin 3 is further depressed, the barrel 7 expands in the radial direction, and the annular projection 4a of the spindle 4 gets over the step 9 formed in the inner wall of the grommet 2. In this state, the grommet 2 and the pin 3 are engaged with each other, and the clip is firmly fixed into the hole of the panel.

However, with the conventional clip 1, the hinges 5 coupling the spindle 4 of the pin 3 to the grommet 2 are arranged in the same plane in which the V-shaped leg 6 extends. In addition, the hinges 5 extend from the middle portion of the V-shaped leg 6 to the tip of the spindle 4. For these reasons, the lengths of the hinges 5 inevitably become short if the grommet 2 is made small in size. As the hinge 5 becomes shorter, the rigidity of the hinge 5 increases, which causes a high reaction against the insertion of the pin 3. Consequently, an increased amount of load is required to push the pin 3 into the grommet 2. In order to this disadvantage, the length of the hinge 5 must be sufficiently long, which prevents the clip 1 to be made compact.

Another problem in the conventional clip 1 is that if the increased rigidity of the hinge 5 of a smaller-sized clip limits the freedom of selecting a material for the hinge 5. Due to the rigidity of the hinge 5, only those materials that have adequate flexibility and elasticity can be used so as not to cause the hinge 5 to break. If a soft material is used, the mechanical strength of the clip is insufficient. Conversely, if a hard synthetic resin is used for purposes of increasing the strengths of the grommet 2 and the pin 3, which is required to securely fix the clip into the hole, then, the clip is easy to break.

SUMMARY OF THE INVENTION

The invention was conceived to overcome these problems in the prior art technique. Therefore, it is one of the objectives of the invention to provide an improved clip structure, which can reduce the load applied to the clip during the insertion of the clip, while preventing the hinges from breaking. This clip structure is especially effective if the clip is small-sized, or if the hinge is made of a hard material for purposes of guaranteeing a secure hold.

The clip of the present invention is a single-unit clip, in which the grommet and the pin are coupled with each other via hinges. The clip comprises a grommet having a V-shaped leg portion, a pin that is movable in the axial direction in the valley of the V-shaped leg portion, and a pair of hinges for coupling the pin with the grommet. The hinges extend in planes not parallel to the plane defined by the V-shaped leg portion of the grommet. Preferably, the hinges extend in planes perpendicular to the plane defined by the V-shaped leg portion.

The hinges are curved in its free state before the clip is actually used, in order to guarantee a sufficient length and flexibility.

The hinges may be twisted in alternate directions in planes no parallel to the plane defined by the V-shaped leg portion. In this case, each hinge couples the pin with a middle portion of an edge of the associated leg pieces of the V-shaped leg.

The grommet has a pair of half barrels extending from top ends of the V-shaped leg and facing each other, and a pair of flanges extending horizontally from top end of the half barrels. Each of the half barrels has a protrusion in its inner face, and grooves are formed on the pin. The protrusions of the half barrels are fit into the grooves of the pin when the pin is pushed into the V-shaped leg of the grommet.

The grommet has a pair of semicircular flanges, and bridges for coupling both ends of each semicircular flange with the pin. In this case, the bridges are cut off if the pin is pushed into the grommet due to a shear stress.

Preferably, grommet, the pin, and the hinges are monolithically formed using a polyacetal resin.

In another aspect of the invention, a clip comprises a grommet having a V-shaped leg portion, a pin movable in the axial direction in a space between the V-shaped leg, and a pair of curved hinges coupling the pin with the V-shaped leg portion of the grommet. In this case, the curved hinges may be arranged in planes parallel to the plane defined by the V-shaped leg portion in an alternate manner.

In still another aspect of the invention, a clip comprises a grommet having a V-shaped leg portion, a pin being movable in the axial direction in a space between the V-shaped leg, and a single curved hinge coupling the pin with the V-shaped leg of the grommet.

The hinge is shaped in, for example, an S-shape. The longitudinal axis of the curved or the S-shaped hinge extends in a plane perpendicular to the plane defined by the longitudinal axes of the V-shaped leg portion.

BRIEF DESCRIPTION OF THE DRAWINGS

Other objects, features, and advantages of the invention will be apparent from the following detailed description in conjunction with the attached drawings, in which.

DETAILED DESCRIPTION OF THE PREFERRED EMBODIMENTS

Figure 7:
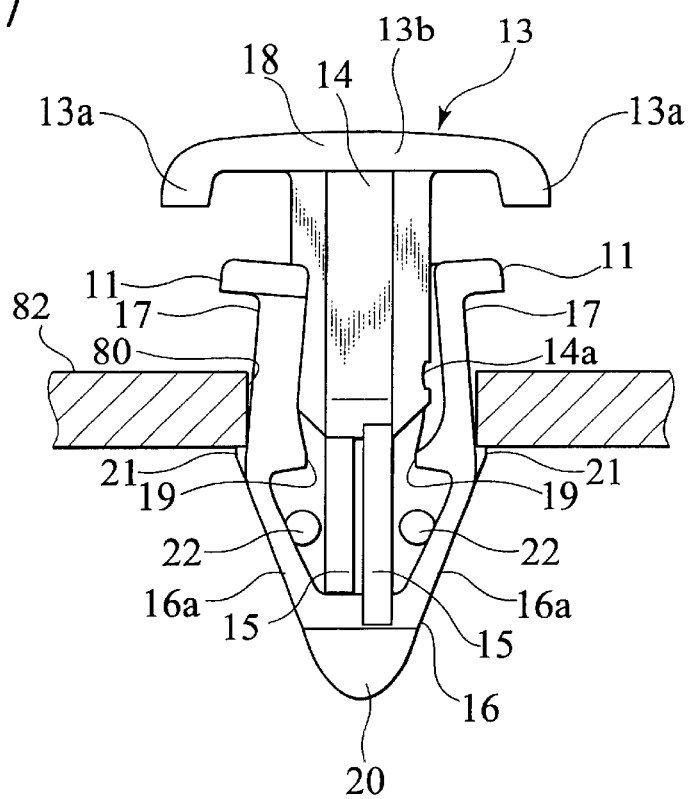
FIG. 7 illustrates the clip that is inserted into a clip-receiving hole formed in a panel and is in the temporarily fixed state.
Figure 8:
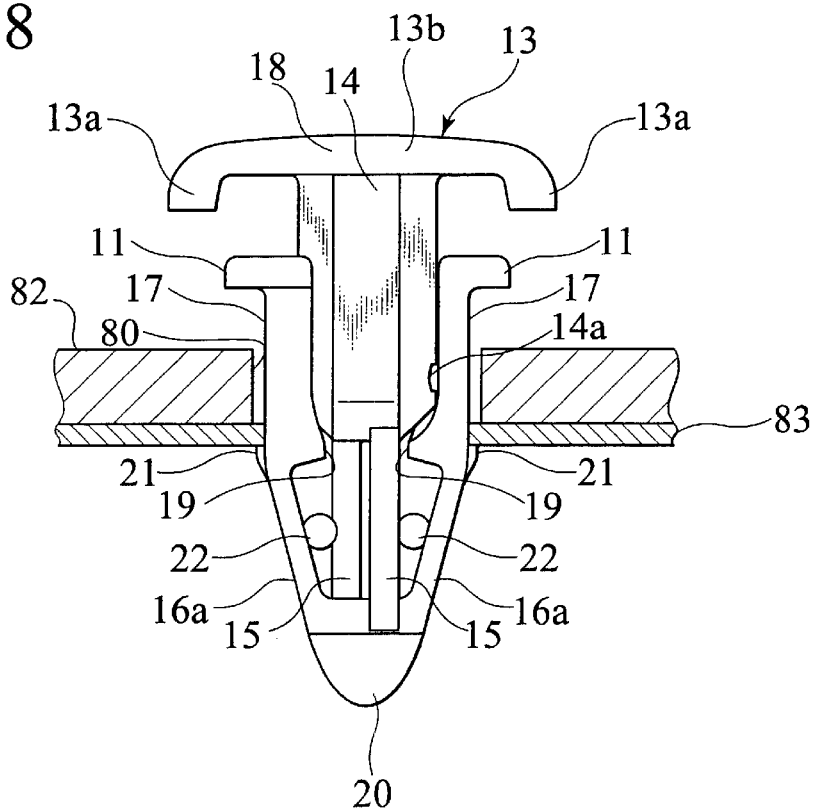
FIG. 8 illustrates the clip that is further inserted into a clip-receiving hole formed in a trim and is still in the temporarily fixed state.
Figure 9:
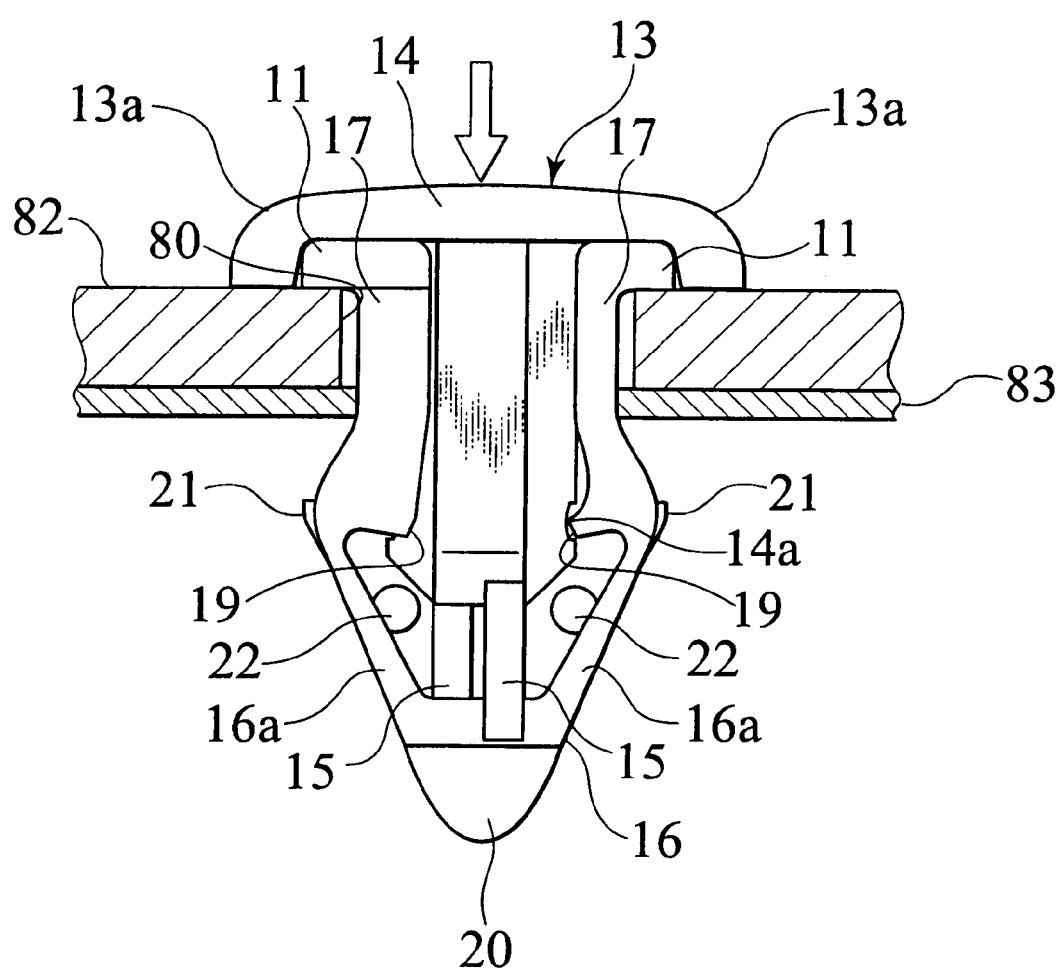
FIG. 9 illustrates the clip that has been finally fixed into the hole, in which the pin is completely pushed into the grommet.

FIGS. 2 through 6 illustrate a clip 10 according to the first embodiment of the invention. The clip is used to hold, for example, an automobile panel 82 and a trim 83 together in a reliable manner, as shown in FIGS. 7 through 9. In the actual use, the clip 10 is inserted into the holes 80 and 81 formed in the panel 82 and the trim 83 in order to hold the panel 82 and the trim 83, which are in tight contact with each other.

The clip 10 of the first embodiment includes a grommet 12 having a V-shaped leg portion 16, and a pin 13 movable in the axial direction in the inner space of the grommet 12. The clip 10 also includes a pair of hinges 15 for coupling the spindle 14 of the pin 13 and the grommet 12 into a single unit. One of the features of the clip 10 of the first embodiment is that the hinges 15 are located in a plane perpendicular to the plane defined by elastic leg pieces 16*a* of the V-shaped leg 16.

To be more precise, the grommet 12 has half barrels 17 facing each other, and a V-shaped leg 16 extending from the bottom ends of the half barrels 17. The V-shaped leg 16 consists of a pair of leg pieces 16*a* and a bottom 20 connecting the leg pieces 16*a* together. The hinges 15 are arranged in a plane perpendicular to the plane defined by the longitudinal axes of the leg pieces 16*a*.

The leg 16 of the grommet 12 remains in a V-shape in the free state. The grommet 12, the pin 13, and the hinges 15 are made of a polyacetal resin, and formed into a single unit. Preferably, the clip 16 is monolithically formed by, for example, molding. The grommet 12 is designed so that the strength of the half barrel 17 is two thousand (2000) times as strong as that of the V-shaped leg 16 (per square meter).

The grommet 12 itself has an elastic force, which causes the grommet 12 to expand outward in the radial direction. The grommet 12 has flanges 11 extending horizontally from the top ends of the half barrels 17. The flanges 11 will catch the edges of the hole 80 formed in the panel 82 when the clip 10 is inserted in the hole 80. The half barrels 17 are made thicker than the V-shaped leg 16. If the average thickness of the V-shaped leg 16 is t1, the bottom 20 of the V-shaped leg 16 has a thickness t2 that is greater than t1 (t2>t1).

Setting the thickness t2 of the bottom 20 greater than the average thickness t1 of the V-shaped leg 16 is profitable for keeping the elastic leg pieces 16a in a V-shape. To be more precise, during the molding process, the bottom 20 solidifies more slowly than the V-shaped leg pieces. The delayed solidification causes the leg pieces 16a to contract and be forced in the attractive direction. This attractive force maintains the leg pieces 16a in the V-shape in the free state, which can prevent the leg pieces 16a of the clips 10 from being entangled with one another during storage or transportation, even if many clips 10 are kept together in disorder.

Figure 3:
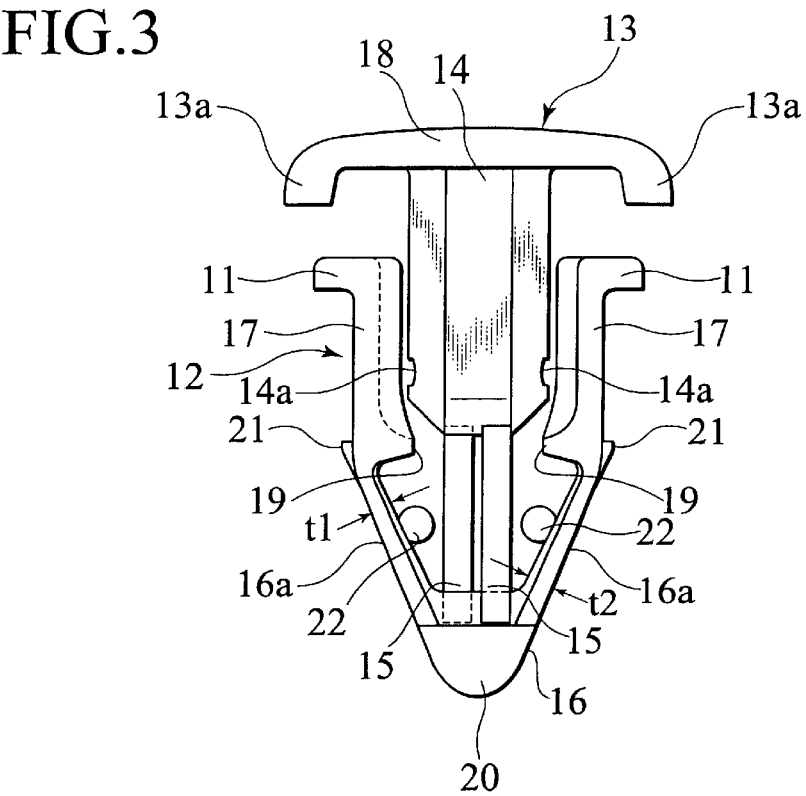
FIG. 3 is a front view of the clip shown in FIG. 2.

Protrusions 19 are formed on the inner face of the half barrels 17, as is clearly illustrated in FIG. 3. The protrusions 19 are fit into stepped grooves 14a formed on the in the spindle 14 when the pin 13 is pushed into the grommet 12 in the actual use of the clip 10. The engagement between the protrusions 19 and the stepped grooves 14a causes the grommet 12 to swell outward, and causes the V-shaped leg 16 to act as an anchor, as illustrated in FIG. 9. Consequently, the clip 10 is completely fixed into the holes 80 and 81 of the panel 82 and the trim 83, thereby securely holding the panel 82 and the trim 83 together.

Figure 2:
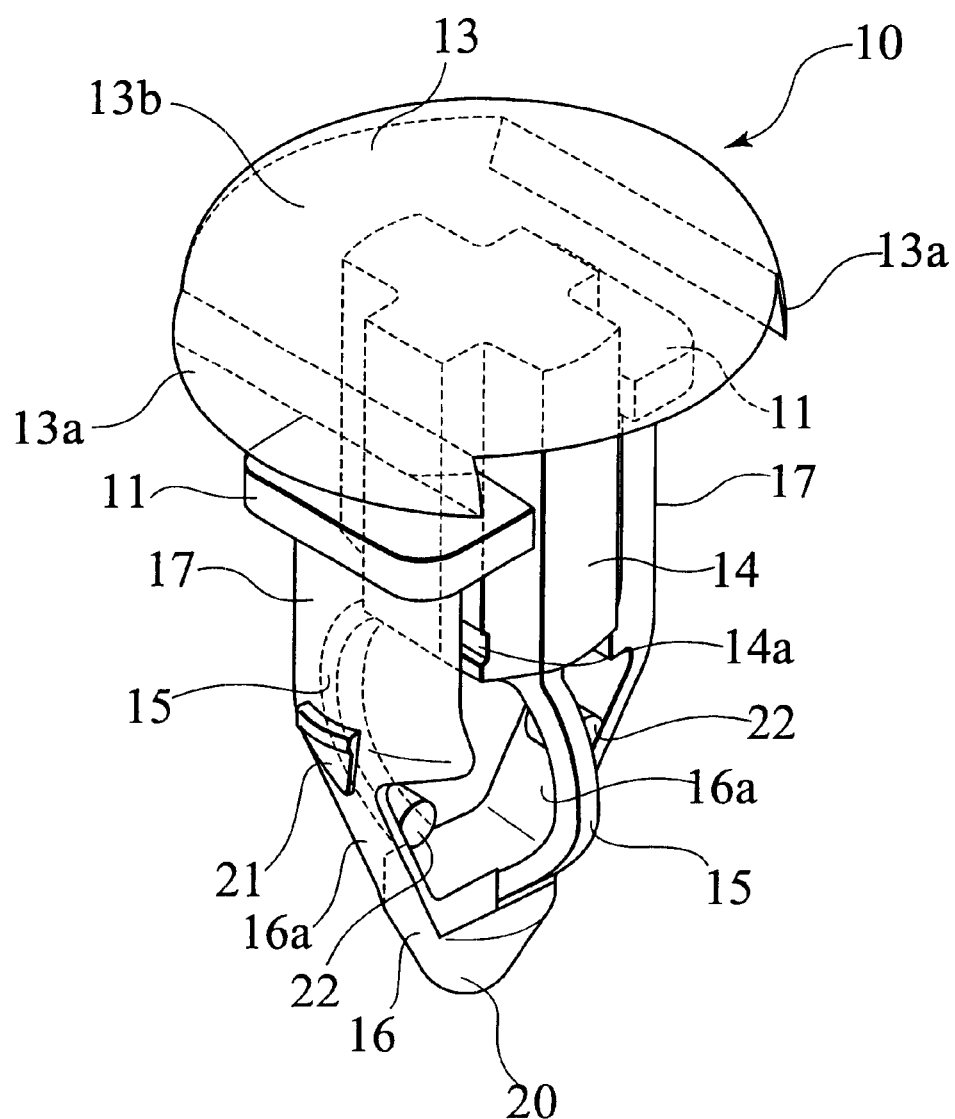
FIG. 2 is a perspective view of a clip according to the first embodiment of the invention.

The grommet 12 has temporary stoppers 21 on its outer faces of the half barrels 17 at or near the boundary with the leg pieces of the V-shaped leg 16. The grommet 12 also has cylindrical protrusions 22 on the inner faces of the leg pieces of the V-shaped leg 16, as shown in FIGS. 2 and 3. The cylindrical protrusions 22 are used to take the clip 10 out of the molding die (not shown) when the molding process is finished. To be more precise, the protrusions 22 are pushed by push pins (not shown) to remove the clip 10 from the molding die.

The pin 13 includes a head 18 and a spindle 14. The head 18 has such a size that the flanges 11 formed in the grommet 12 are completely covered with the head 18 in the free state. The head 18 has tabs 13a, each corresponding to one of the flanges 11 of the grommet 12. If the pin 13 is pushed into the grommet 12 to finally fix the clip 10 to the panel, the flanges 11 come into tight contact with the tabs 13a under the head 18, as illustrated in FIG. 9. The contact between the flanges 11 and the tabs 13a prevents the head 18 from floating above the surface of the panel 82.

Figure 4:
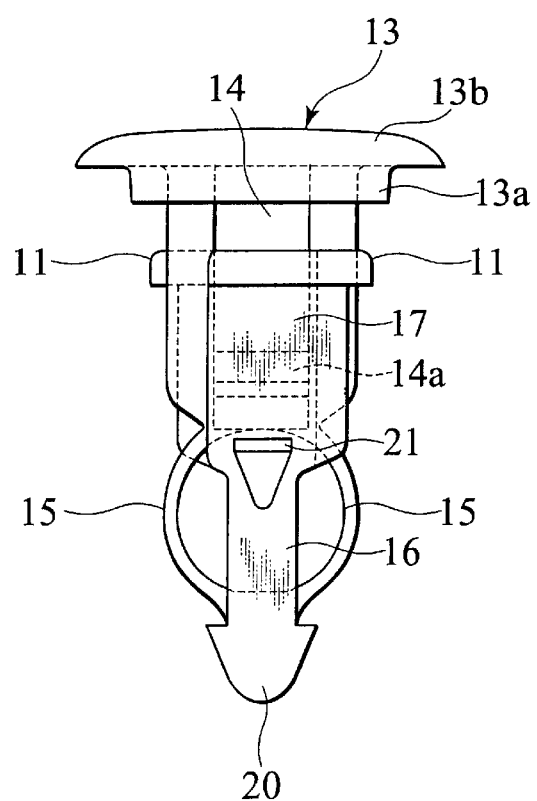
FIG. 4 is a side view of the clip shown in FIG. 2.
Figure 5:
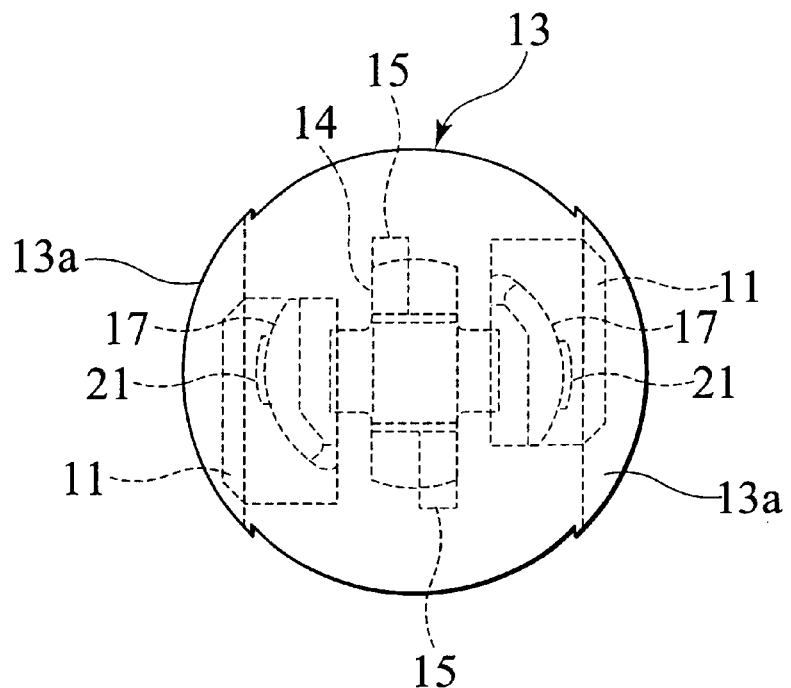
FIG. 5 is a plan view of the clip shown in FIG. 2.
Figure 6:
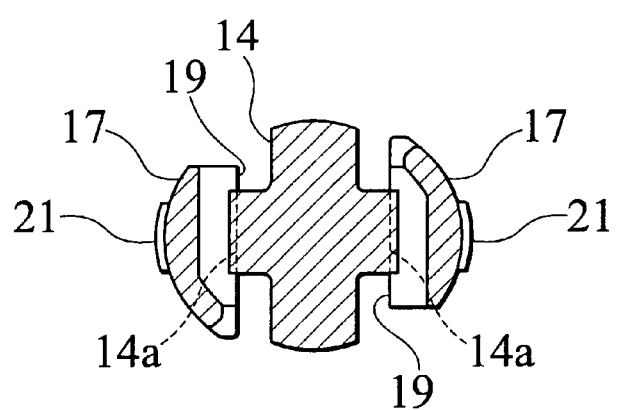
FIG. 6 is a horizontal cross-sectional view of the grommet that is an element of the clip shown in FIG. 2.

The horizontal cross-section of the spindle 14 is a cross, as indicated by the dashed line in FIG. 2, for the sake of easy positioning. As has been mentioned above, stepped grooves 14a are formed on the spindle 14. A pair of hinges 15 extends from the tip of the spindle 14 toward the bottom 20 of the V-shaped leg 16. The hinges 15 are C-shaped, as illustrated in FIGS. 2, and 4. The C-shaped hinges 15 are located in a plane perpendicular to the plane defined by the axes of the leg pieces 16a of the V-shaped leg 16. In addition, the hinges 15 are positioned in an alternate manner, as illustrated in FIGS. 3, 5, and 7 through 9.

The C-shaped hinges 15, which extend in a plane perpendicular to the plane defined by the V-shaped leg 16 of the grommet 12, can guarantee an adequate length even if the clip itself is made compact. If the hinge 15 has a sufficient length, the flexibility of the hinges 15 increases, and consequently, a force required to insert the grommet 12 into the holes and a force required to push the pin 13 into the grommet 12 can be reduced. Even if the clip 10 is made of a hard material, the hinges 15 will not break easily because of their flexibility.

In the actual use of the clip 10, the grommet 12 is picked between fingers and pressed inward so that the half barrels 17 are brought closer to each other. Then, the grommet 12 is inserted in the hole 80 of the panel 82 from the bottom of the V-shaped leg 16, as shown in FIG. 7, while keeping the half barrels 17 close to each other. If the grommet 12 is released from the fingers, the half barrels 17 return to the home position by their own elasticity, and the outer faces of the half barrels 17 having a sufficient thickness come into tight contact with the periphery of the hole 80a. In this state, the temporary stoppers 21 formed on the outer face of the grommet 12 are in contact with the inner edge of the hole 80 at the bottom face (or the bottom face in FIG. 7) of the panel 82 in FIG. 6.

Then, the clip 10 is inserted in the hole 81 of the trim 83, as shown in FIG. 8. Since the hole 81 of the trim 83 is made smaller than the hole 80 of the panel 82, the half barrels 17 of the grommet 12 are brought further closer to each other, and consequently, the grommet 12 is further compressed in the radial direction. Once the temporary stoppers 21 have passed through the hole 81 of the trim 83, the grommet 12 slightly expands in the radial direction under the return force, and the temporary stoppers 21 catch the edge of the hole 81 on the inner face of the trim 83.

Then, the head 18 of the pin 13 is depressed, as indicated by the arrow shown in FIG. 9. The spindle 14 of the pin 13 advances between the elastic leg pieces 16a toward the bottom 20 of the V-shaped leg 16. At this moment, the C-shaped hinges 15 are bending more outward. With this arrangement, the pin 13 can be pushed down without being much affected by the reaction force of the C-shaped hinges 15.

If the spindle 14 of the pin 13 is further pushed down, the stopper protrusions 19 formed on the inner faces of the half barrels 17 fit into the grooves 14a formed near the tip of the spindle 14. In this state, the pin 13 and the grommet 12 are engaged with each other, and the boundary between the half barrel 17 and the V-shaped leg 16 swells outward. The swelling grommet 12 acts as an anchor, and the clip 10 is fixed into the holes 80 and 81 of the body panel 82 and the trim 83. The swelling grommet 12 can also prevent the clip 10 from coming off the holes 80 and 81 even if an external force is applied to the clip 10 in the direction of removing the clip 10 from the holes 80 and 81. Even in such a situation, the reaction force of the hinges 15 is negligible because the hinges 15 have an adequate length and a sufficient flexibility.

FIGS. 10 through 13 illustrate a clip according to the second embodiment of the invention. FIGS. 14 through 17 illustrate a clip according to the third embodiment of the invention. FIGS. 18 through 21 illustrate a clip according to the fourth embodiment of the invention. FIGS. 22 through 25 illustrate a clip according to the fifth embodiment of the invention. The clips illustrated in these embodiments have basically the same structures as that of the first embodiment, but for the hinges 15. Accordingly, the same elements as those in the first embodiment are denoted by the same numerical reference, and the explanation for them will be omitted.

Figure 10:
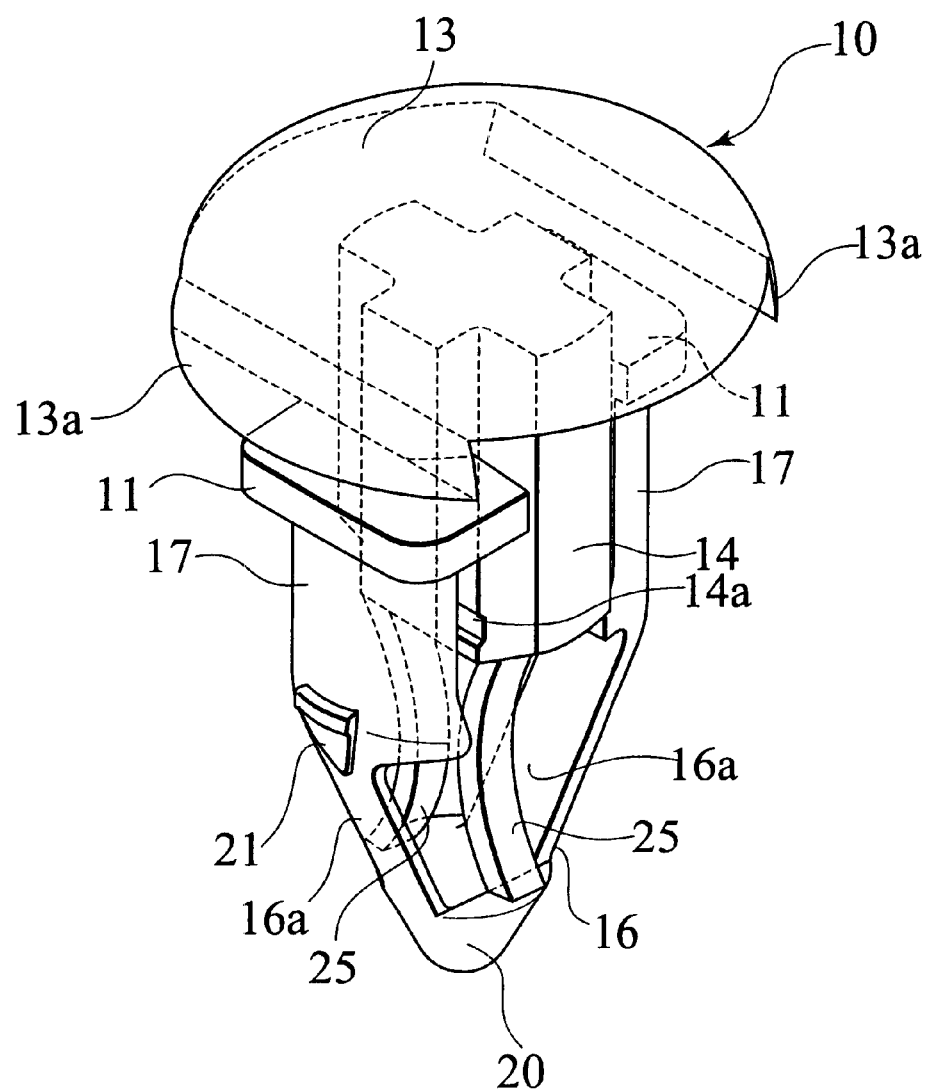
FIG. 10 is a perspective view of a clip according to the second embodiment of the invention.
Figure 11:
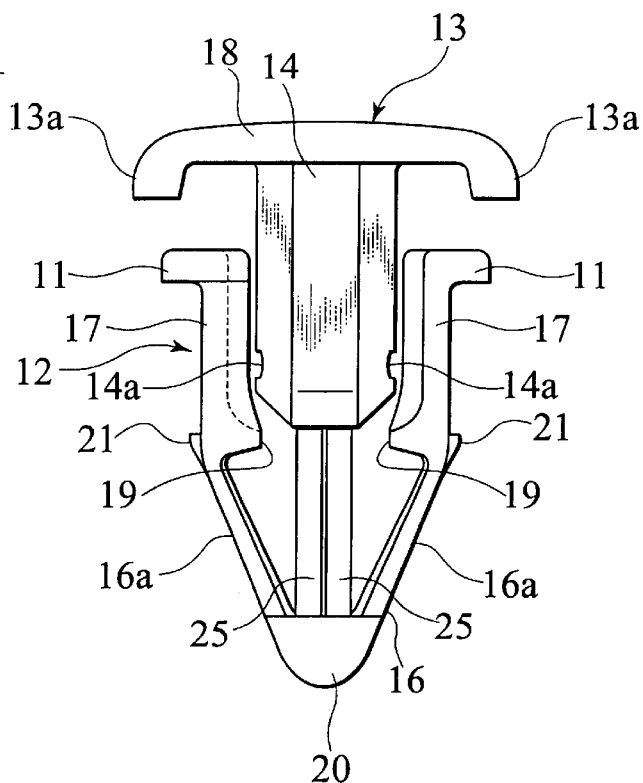
FIG. 11 is a front view of the clip shown in FIG. 10.
Figure 12:
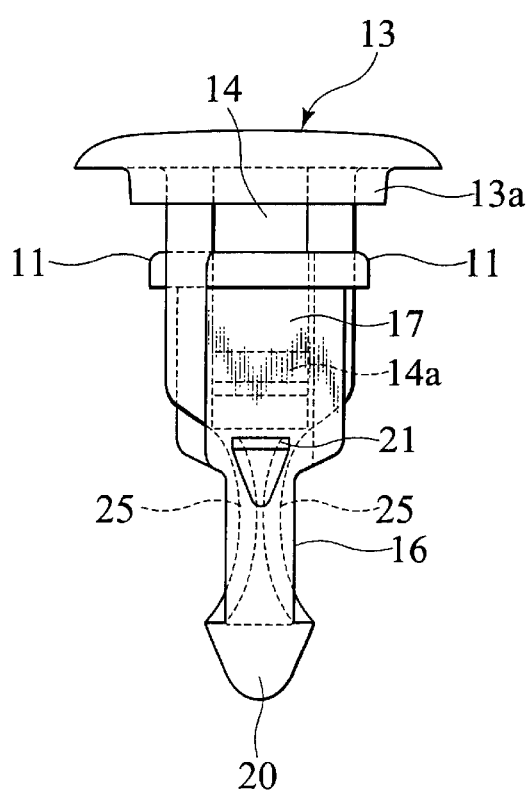
FIG. 12 is a side view of the clip shown in FIG. 10.
Figure 13:
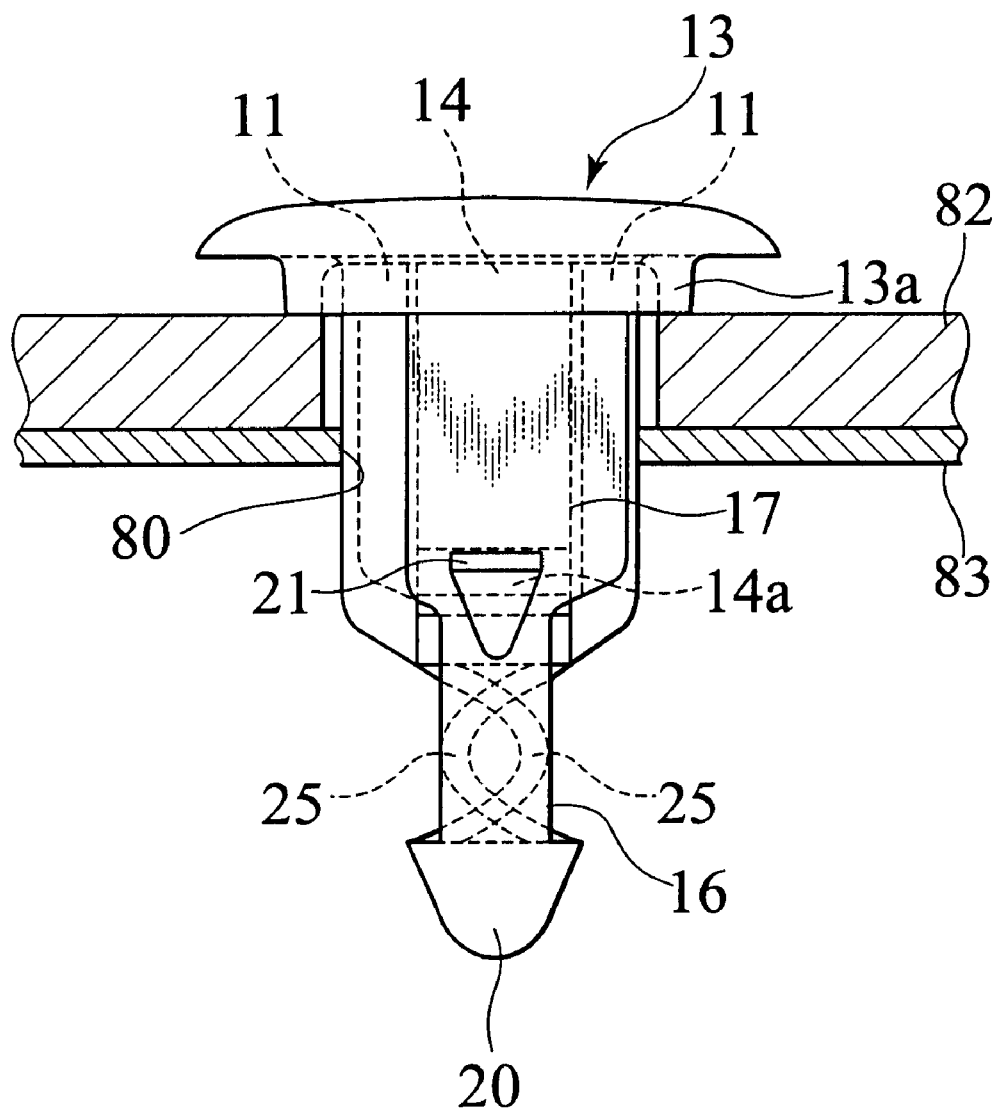
FIG. 13 illustrates how the clip of the second embodiment is finally fixed into the hole with the pin completely pushed into the grommet.
Figure 14:
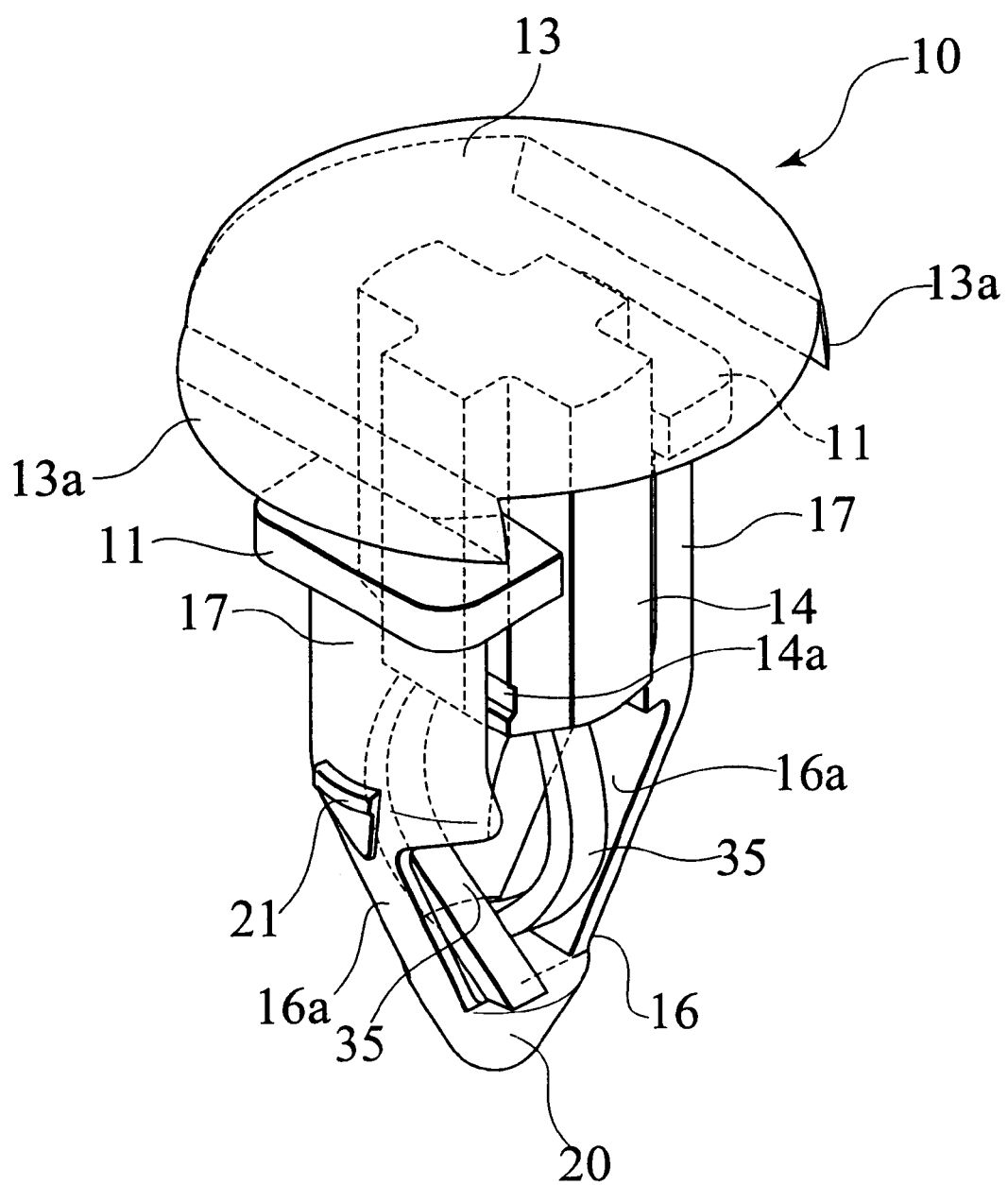
FIG. 14 is a perspective view of a clip according to the third embodiment of the invention.
Figure 15:
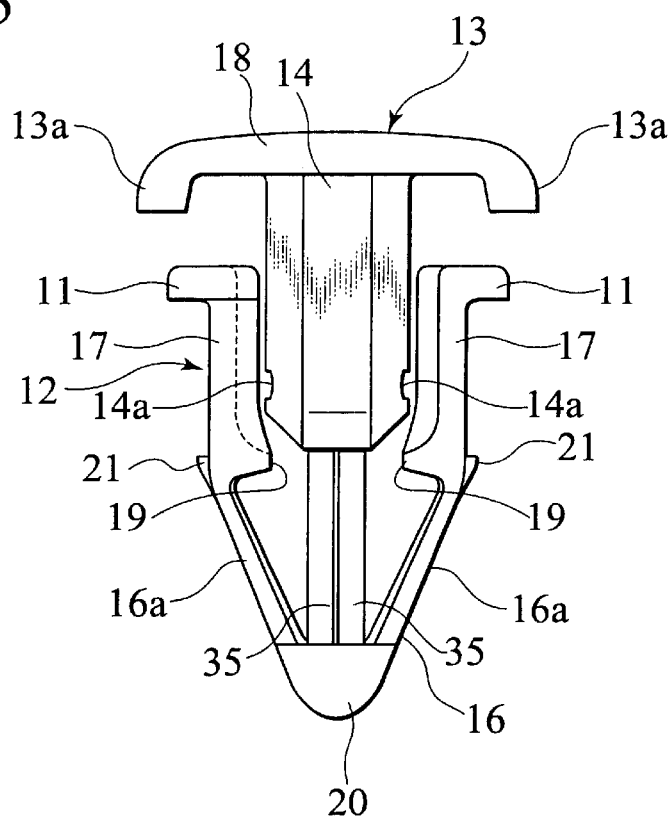
FIG. 15 is a front view of the clip shown in FIG. 14.
Figure 16:
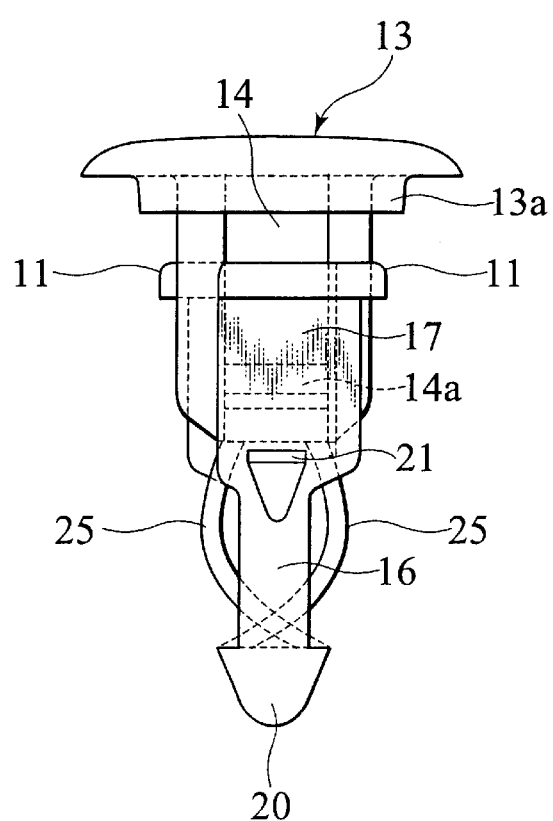
FIG. 16 is a side view of the clip shown in FIG. 14.

The clip 10 of the second embodiment has C-shaped hinges 25 that are bent inward, as shown in FIGS. 10 and 12, and therefore, they are positioned inside the gap between the V-shaped leg 16. The hinges 25 are arranged in an alternate manner, as shown in FIG. 11. When the pin 13 is pushed into the V-shaped leg 16, the C-shaped hinges 25 are bending more, crossing each other still in the gap between the V-shaped leg 16. This arrangement can save the space required to fix the clip 10, because the hinge 25 do not expand outward when the clip is finally fixed into the hole, unlike the hinges 15 of the first embodiment.

Figure 17:
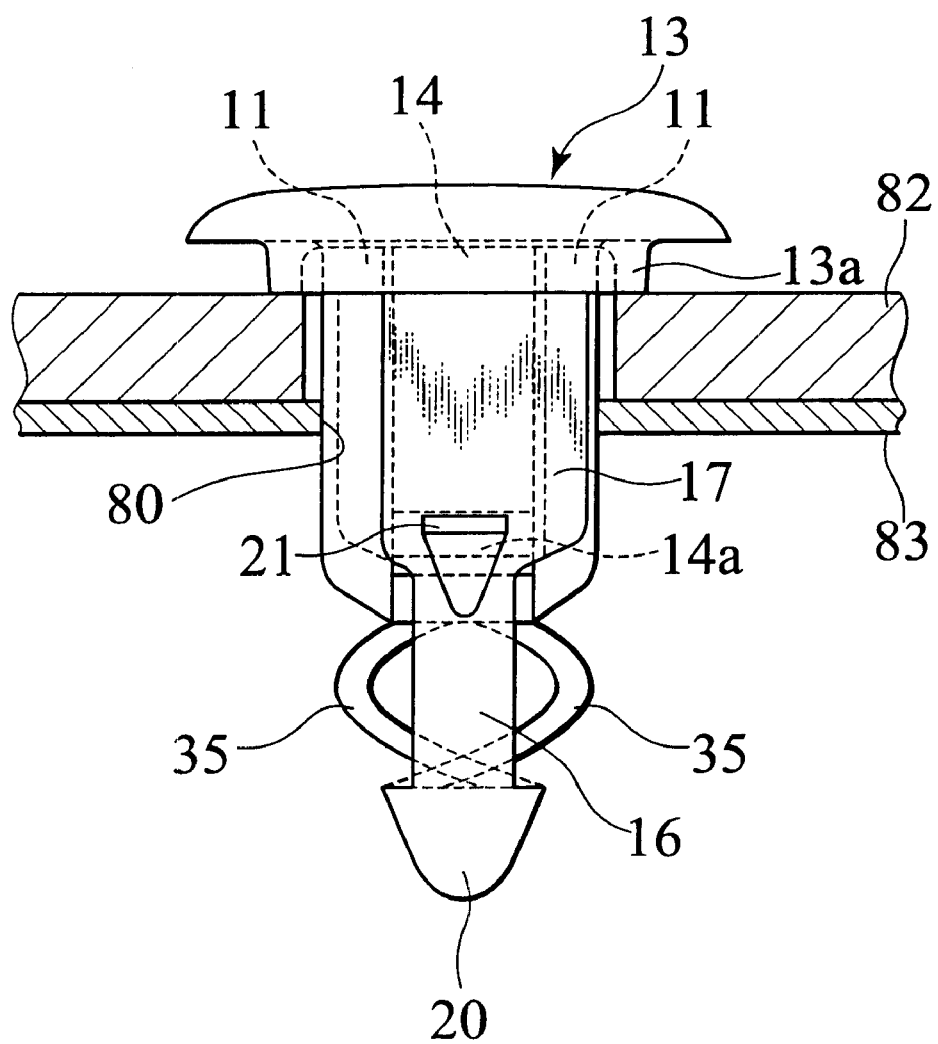
FIG. 17 illustrates how the clip according to the third embodiment is finally fixed into the hole with the pin completely pushed into the grommet.

The clip 10 of the third embodiment has C-shaped hinges 35, which are located in a plane perpendicular to the plane defined by the longitudinal axes of the leg pieces 16a. In the third embodiment, the lower ends of the hinges 35 cross each other at the bottom 20 of the V-shaped leg 16, as is clearly illustrated in FIGS. 14 and 16. With this arrangement, the hinges 35 stay inside the half barrels 17, as shown in FIG. 17, even if the pin 13 is pushed into the V-shaped leg 16. Accordingly, the grommet 12 of the clip 10 is inserted into the holes 80 and 81 smoothly, without causing the hinges 35 to be caught at the edges of the holes 80 and 81.

Figure 18:
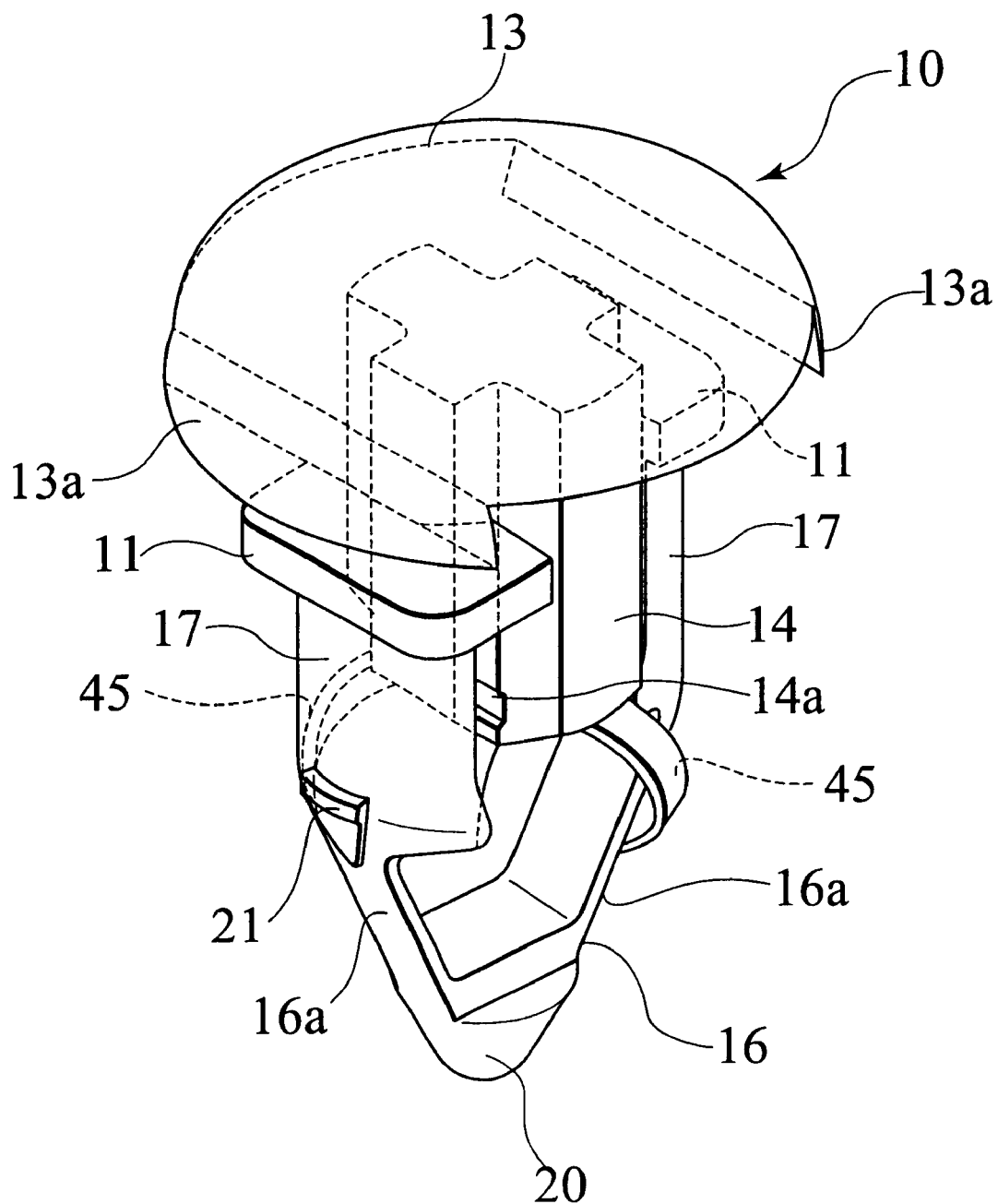
FIG. 18 is a perspective view of a clip according to the fourth embodiment of the invention.
Figure 19:
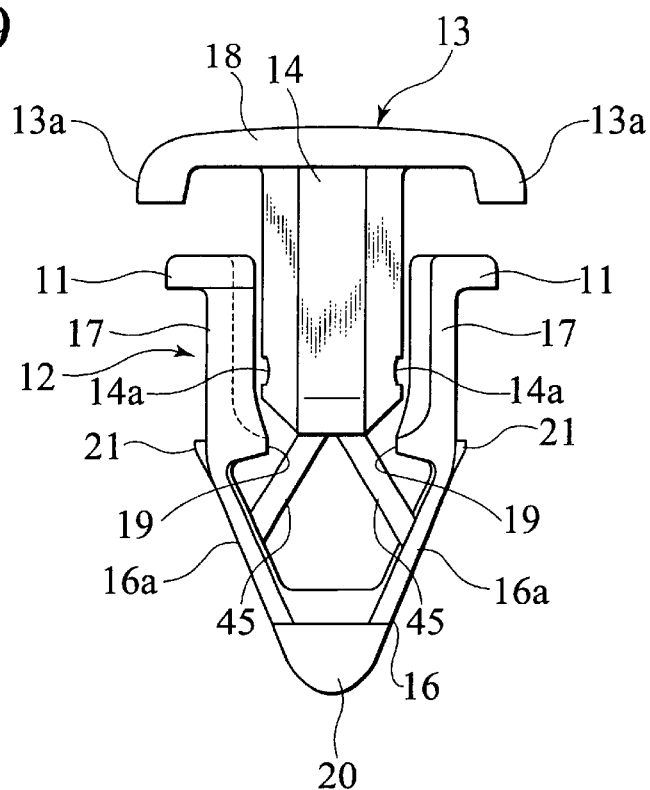
FIG. 19 is a front view of the clip shown in FIG. 18.
Figure 20:
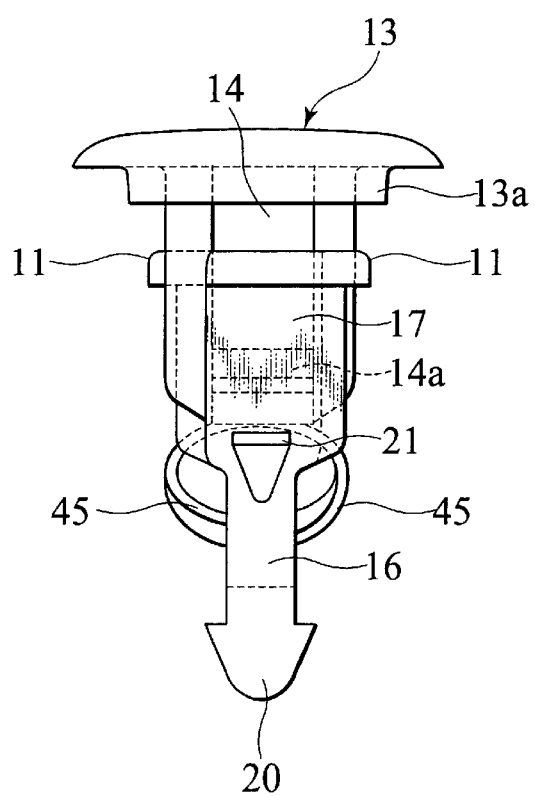
FIG. 20 is a side view of the clip shown in FIG. 18.
Figure 21:
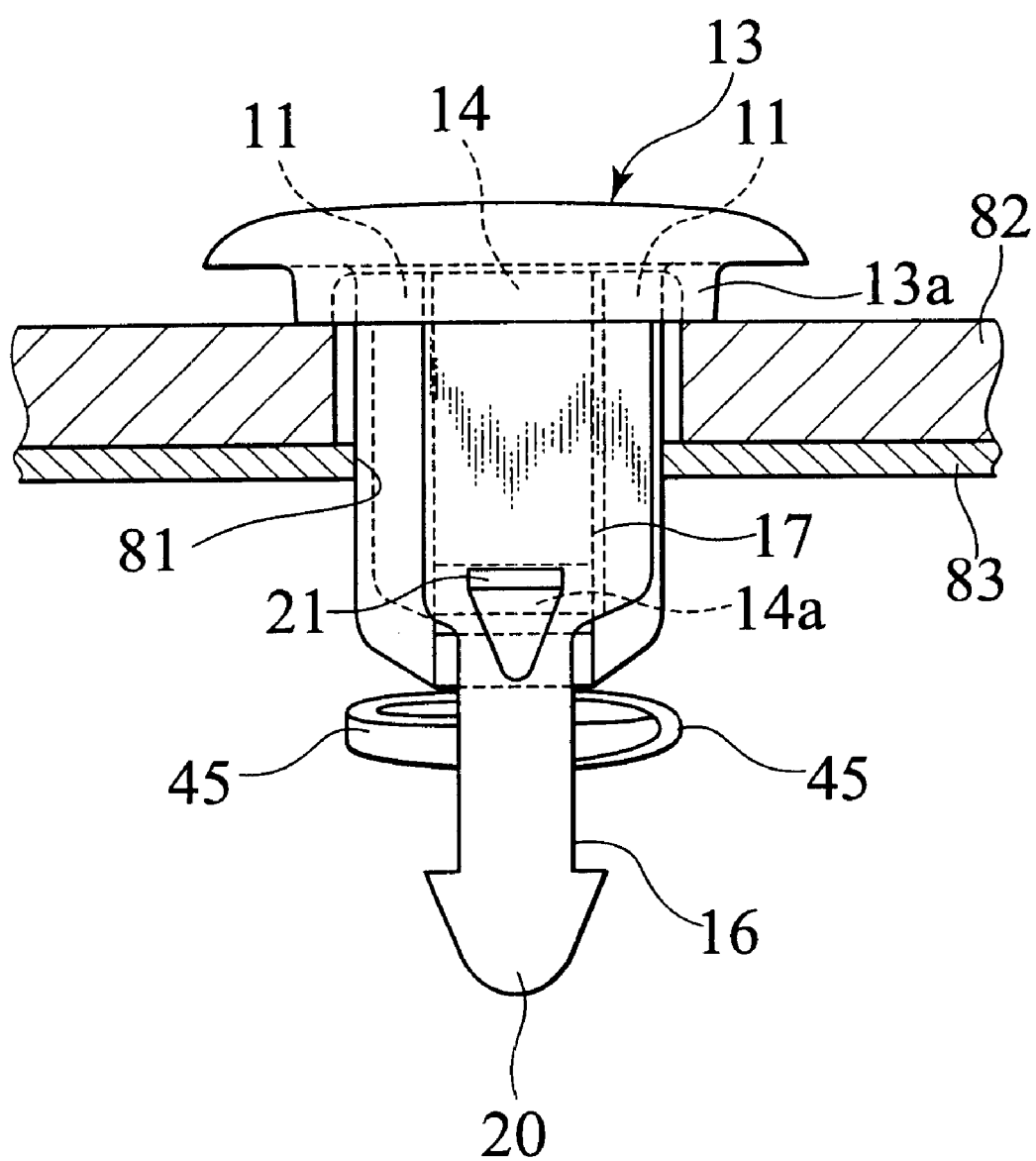
FIG. 21 illustrates how the clip of the fourth embodiment is finally fixed into the hole with the pin completely pushed into the grommet.

The clip 10 of the fourth embodiment has hinges 45, which are slightly twisted in opposite directions and extend in planes different from the plane defined by the V-shaped leg 16, as illustrated in FIG. 18. Each hinge 45 extends from the tip of the spindle 14, and the other end of the hinge 45 is connected to the middle of the edge of one of the leg pieces 16a. The hinges 45 extend in an alternate manner, as in the first through third embodiments. The clip with the hinges 45 can achieve the same effect, namely, it does not require a strong force to push the pin 13 into the grommet 12 because the hinges 45 have an adequate length.

Figure 22:
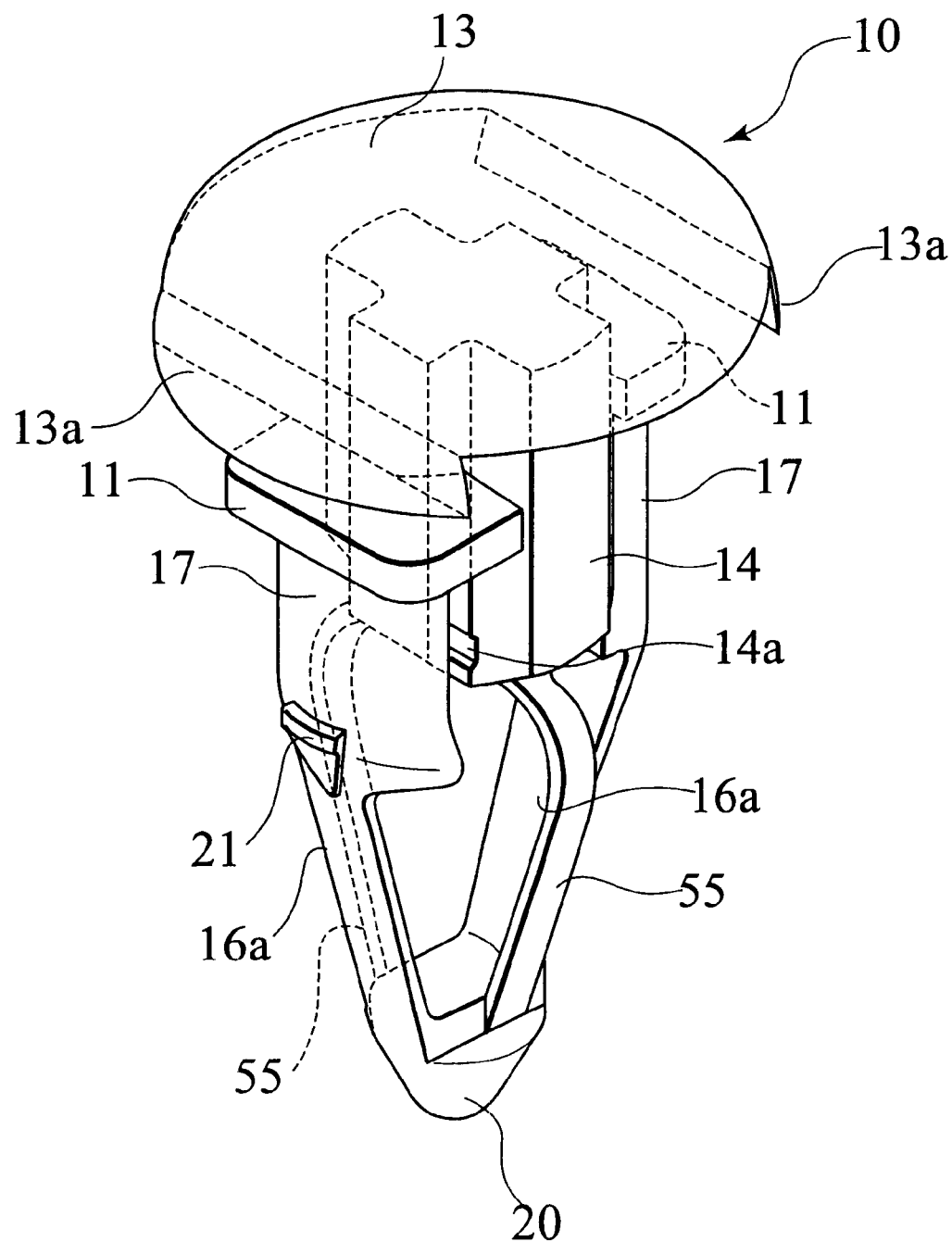
FIG. 22 is a perspective view of a clip according to the fifth embodiment of the invention.
Figure 23:
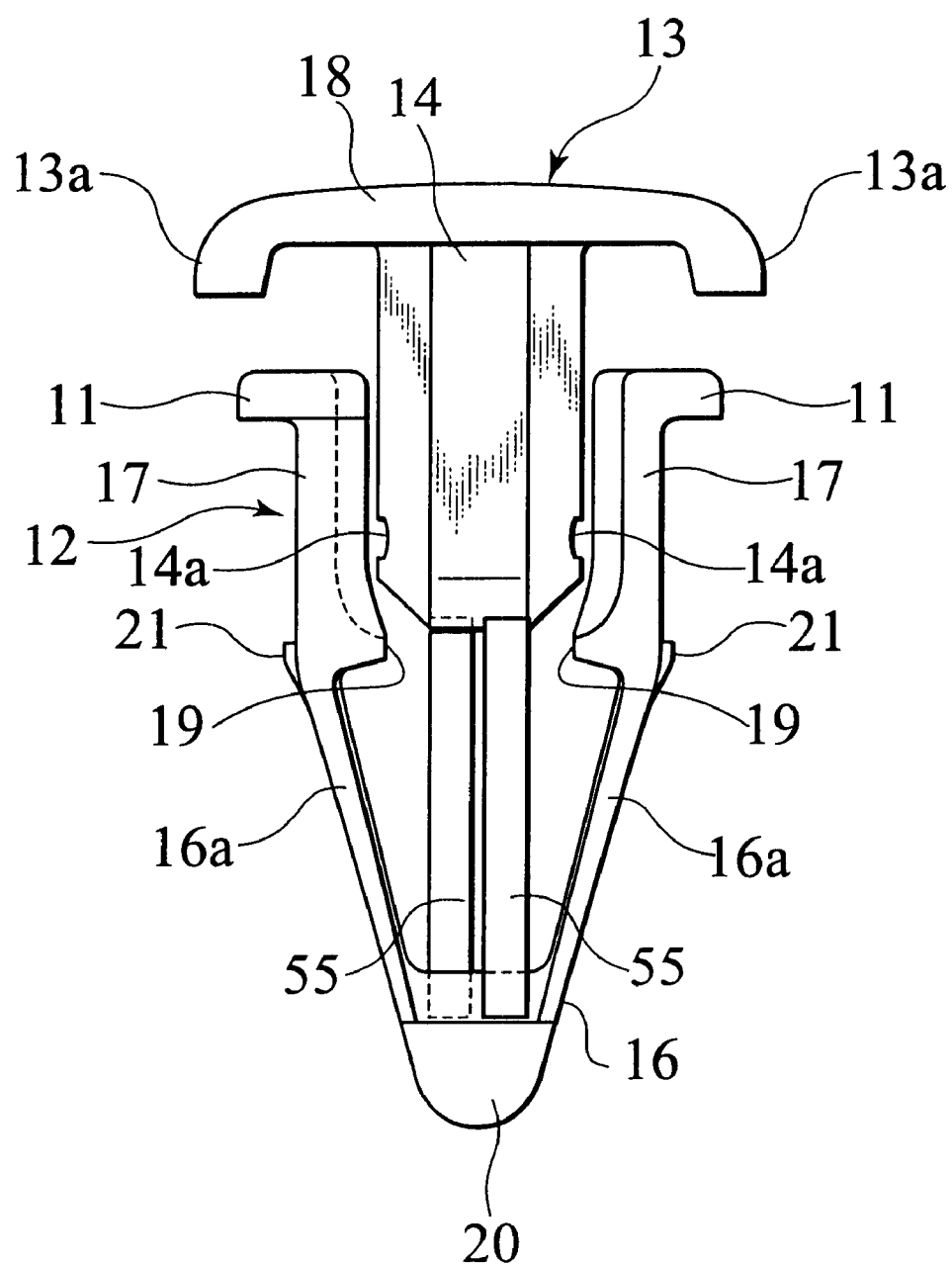
FIG. 23 is a front view of the clip shown in FIG. 22.
Figure 24:
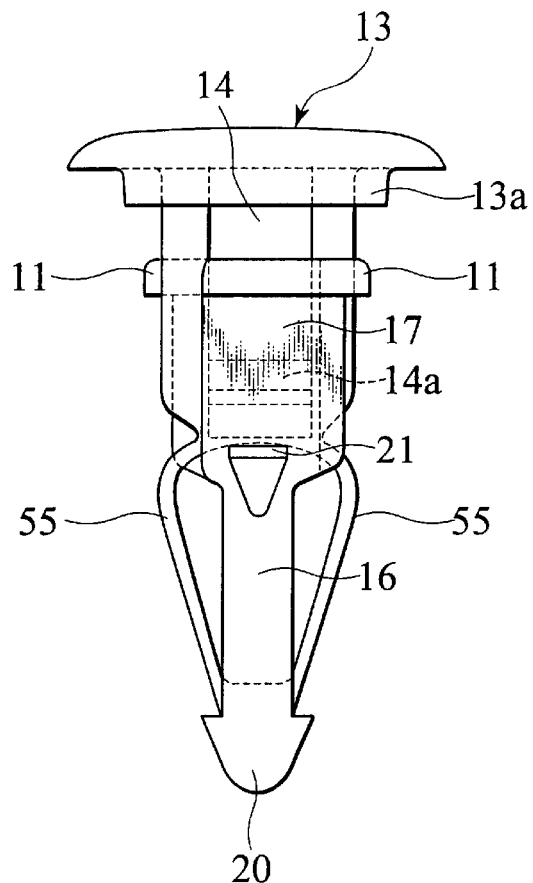
FIG. 24 is a side view of the clip shown in FIG. 22.
Figure 25:
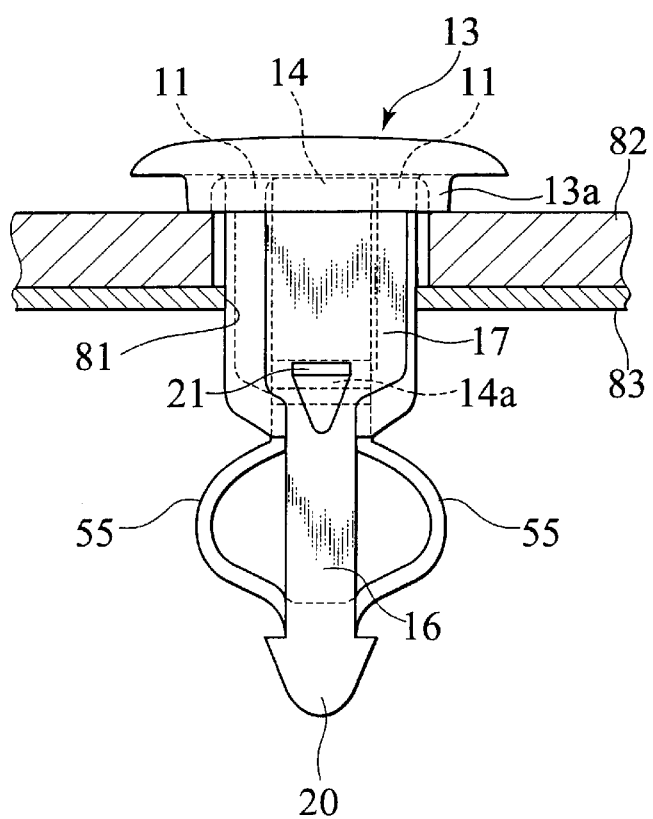
FIG. 25 illustrates how the clip of the fifth embodiment is finally fixed into the hole with the pin completely pushed into the grommet.
Figure 26:
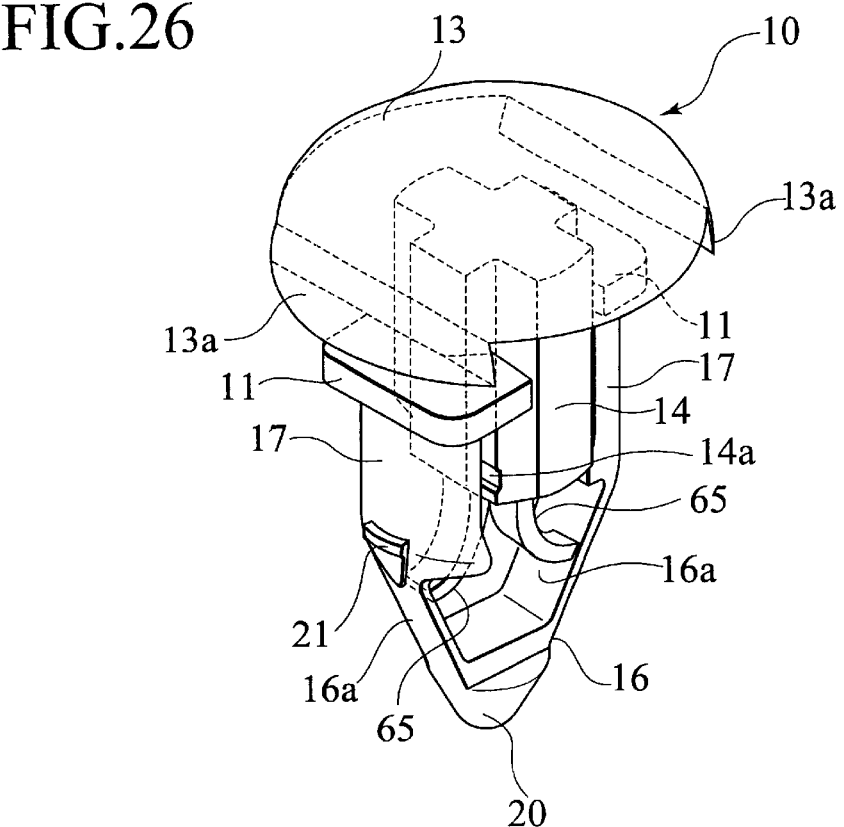
FIG. 26 is a perspective view of a modification of the clip shown in FIG. 22.
Figure 27:
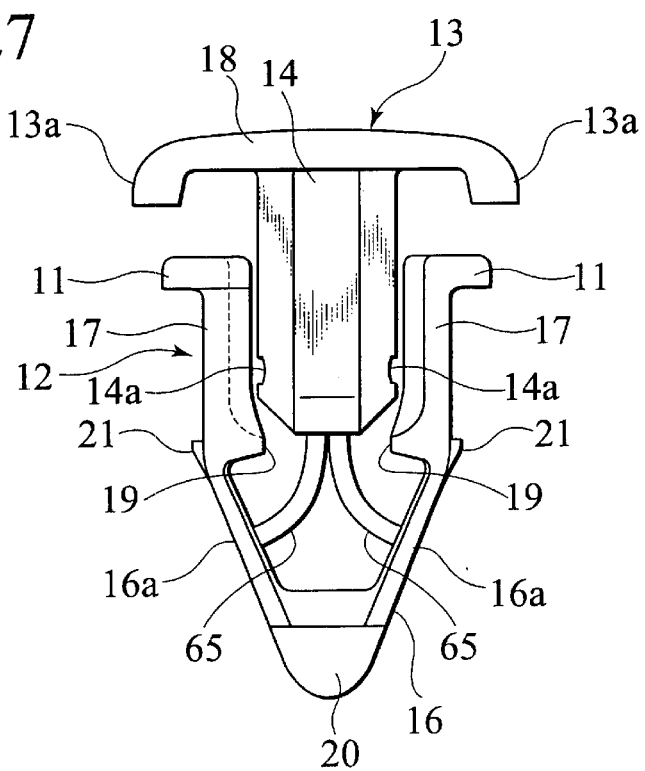
FIG. 27 is a front view of the modification shown in FIG. 26.
Figure 28:
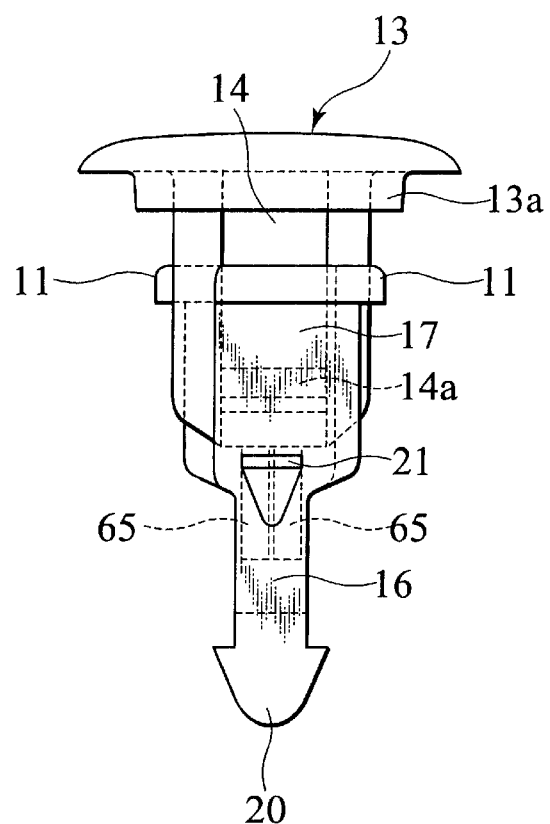
FIG. 28 is a side view of the modification shown in FIG. 26.

The clip according to the fifth embodiment has hinges 55, which are rounded L-shaped, as illustrated in FIGS. 22 and 24. The hinges 55 are designed so as to located under the half barrels 17 of the grommet 12 without projecting outward the half barrels 17 in the unused state, as shown in FIG. 24. Accordingly, the clip 10 can be inserted into the holes 80 and 81, without causing the hinges 55 to be caught by the edges of the holes 80 and 81. When the pin 13 is completely pushed into the grommet 12, the hinges 55 expand slightly outward, as illustrated in FIG. 25. However, it does not adversely affect the fixed clip 10 because the hinges 55 are sufficiently long to absorb the pushing force of the pin 13.

In the above-described embodiments, the hinges are arranged in planes other than the plane defined by the V-shaped leg 16 in order to guarantee an adequate length. However, the functions and advantages of the hinges stated above may also be achieved even if hinges are arranged in planes parallel to the plane defined by the V-shaped leg 16 by using J-shaped hinges positioned in an alternate manner.

Figure 1:
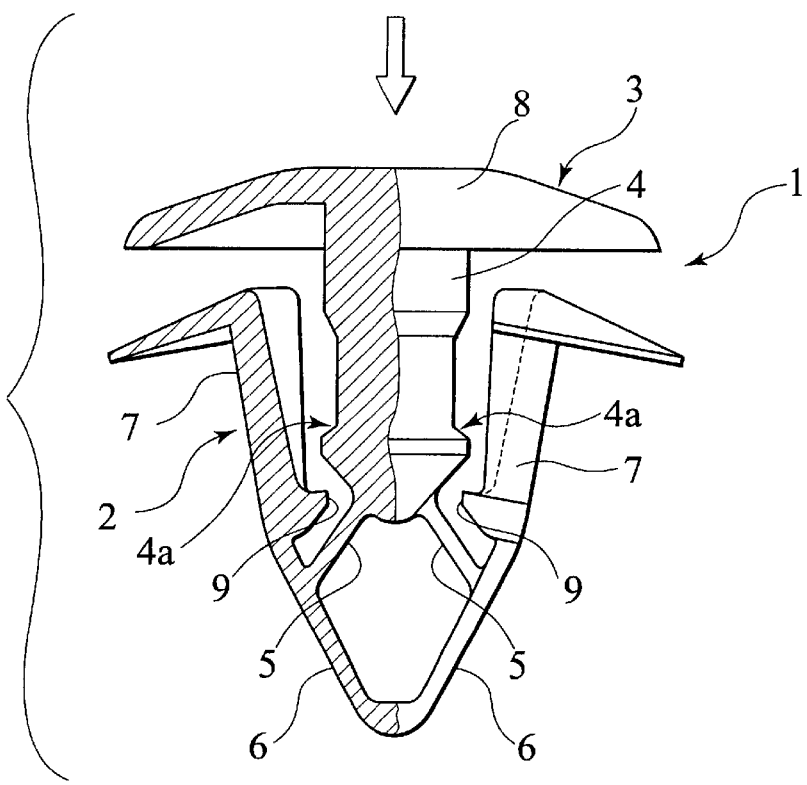
FIG. 1 is a vertical cross-sectional view of a conventional single-unit clip.
Figure 29:
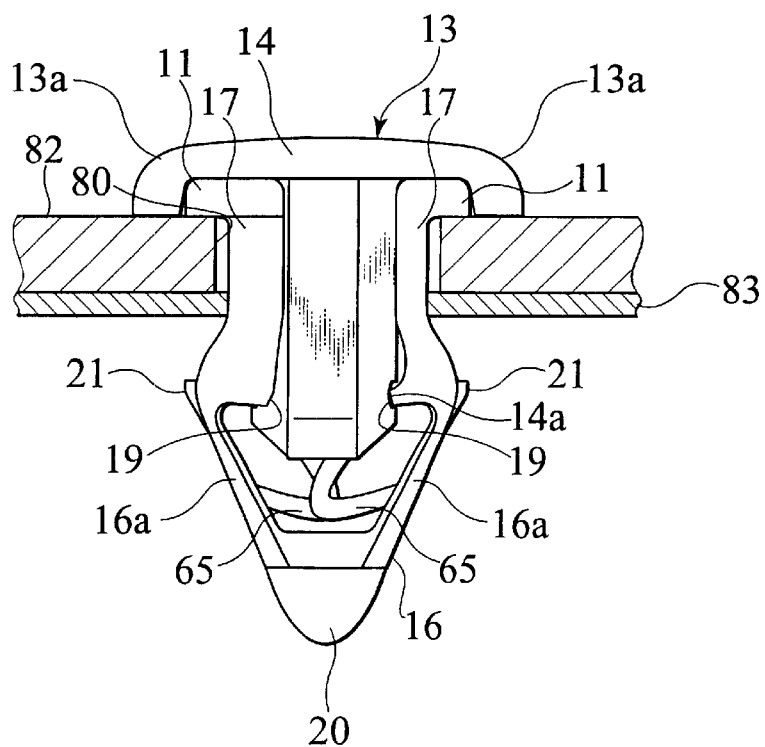
FIG. 29 illustrates how the modification shown in FIG. 26 is finally fixed into the hole with the pin completely pushed into the grommet.
Figure 30:
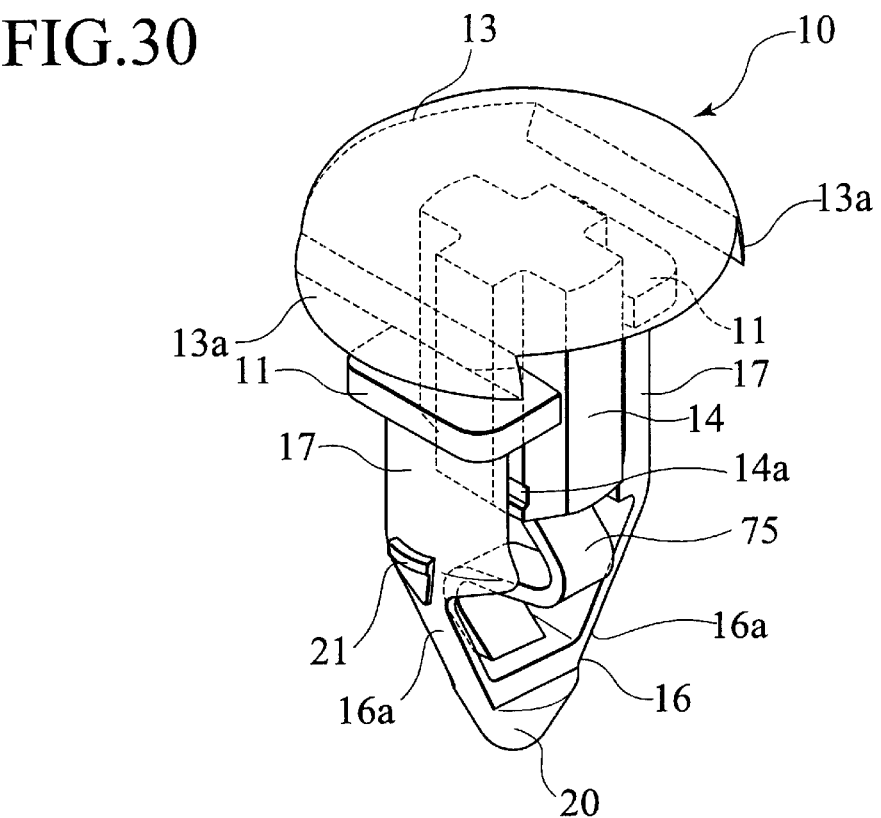
FIG. 30 is a perspective view of the second modification of the clip shown in FIG. 22.
Figure 31:
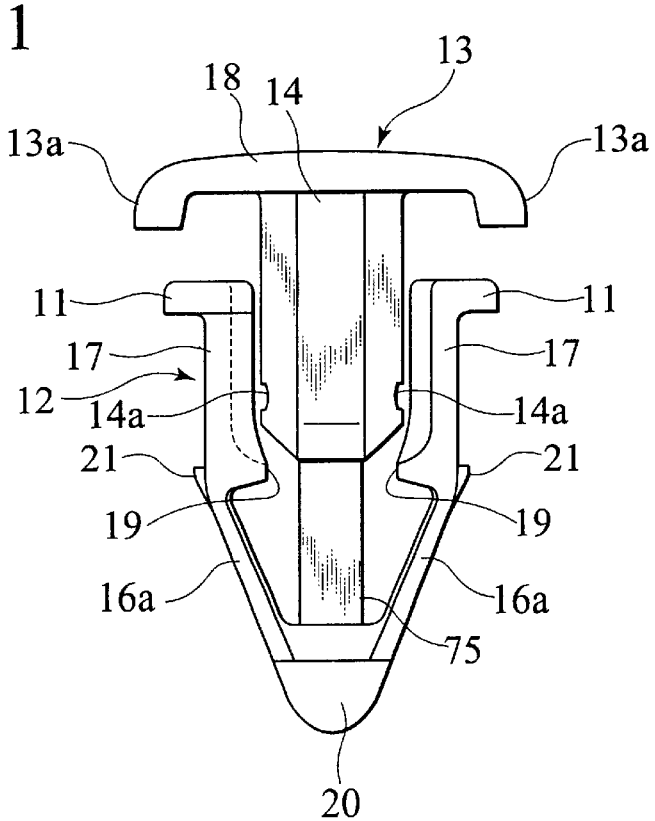
FIG. 31 is a front view of the second modification shown in FIG. 30.
Figure 32:
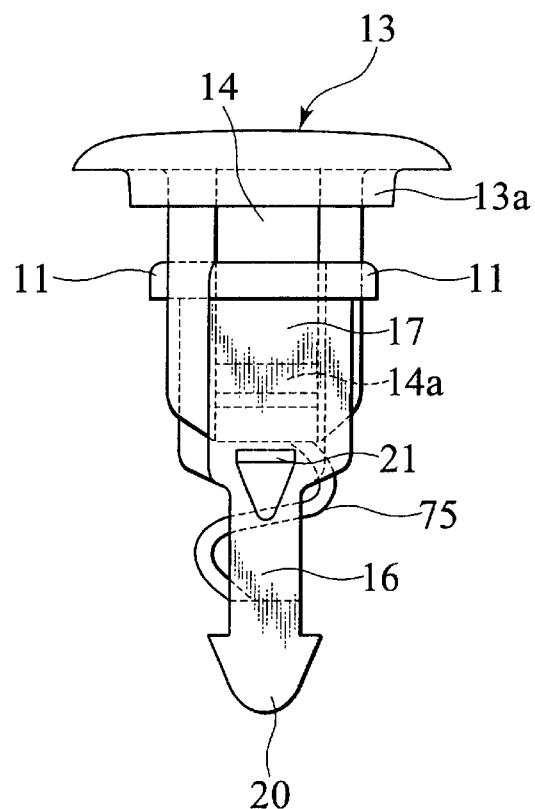
FIG. 32 is a side view of the second modification shown in FIG. 30.
Figure 33:
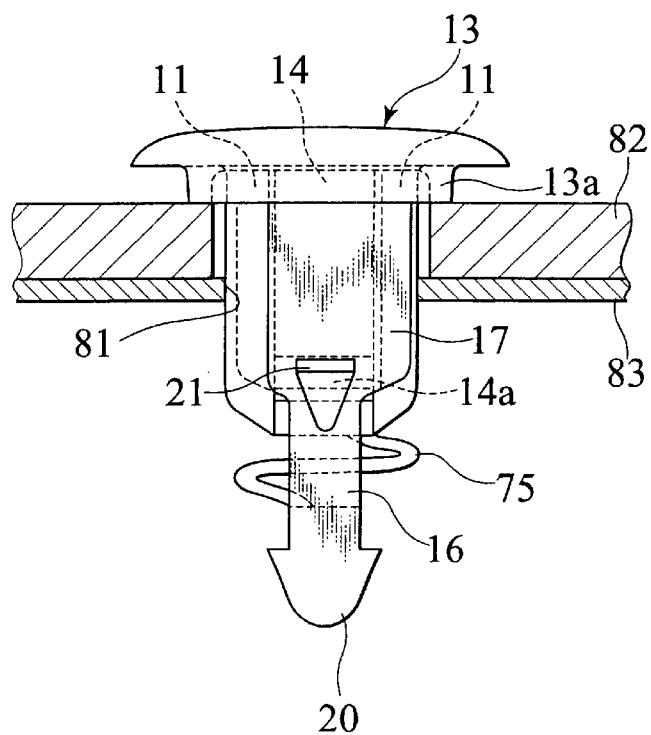
FIG. 33 illustrates how the clip of the second modification is finally fixed into the hole.

FIGS. 26 through 29 illustrate such a modification, in which J-shaped hinges 65 extend from the tip of the spindle 14 to the inner face of the leg pieces 16a of the V-shaped leg 16 in planes parallel to the plane defined by the V-shaped leg 16. In this case, if the pin 13 is completely pushed into the grommet 12, the hinges 65 are deformed into acute shapes, and cross each other in the gap between the V-shaped leg 16, as illustrated in FIG. 29. In this modification, the J-shaped hinges 65 are designed so as to be longer than the hinges 5 of the conventional clip shown in FIG. 1 in order to guarantee sufficient flexibility.

FIGS. 30 through 33 illustrates another modification, in which a single hinge 75 is used, instead of using a pair of hinges. The hinge 75 is S-shaped, and the longitudinal axis of the hinge 75 extends in a plane perpendicular to the plane defined by the V-shaped leg 16. With this modification, if the pin 13 is completely pushed into the grommet 12, the S-shaped hinge 75 is compressed, like a spring. Since the S-shaped hinge 75 has a sufficient length, it is flexible, while maintaining a mechanical strength. Accordingly, the pin 13 can be pushed into the grommet 12 without requiring a strong force, and likelihood of breakage of the hinge can be eliminated.

FIGS. 34 through 44 illustrate a clip 100 according to the sixth embodiment of the invention. The clip 100 includes a grommet 102, a pin 103 positioned in the grommet 102, and a pair of hinges 15 coupling the tip of the pin 13 to the bottom of the grommet 102. The grommet 102 has a pair of half barrels 17, and a V-shaped leg portion 16 extending from the lower ends of the half barrels 17. The V-shaped leg 16 consists of a pair of facing leg pieces 16a and a bottom 20 connecting the leg pieces 16a.

In the sixth embodiment, the hinges 15 are made of a nylon resin because a nylon resin is more flexible than a polyacetal resin. The clip of the sixth embodiment requires an additional stroke for further pushing the pin 103 from the finally fixed position toward the pin-releasing position, which will be explained in more detail below. If the hinges 15 are made of a polyacetal resin, the hinges 15 must be sufficiently long in order to prevent breakage of the hinges 15 during the additional stroke of the pin 103. Nylon resin is more flexible than polyacetal resin, and therefore, it is not necessary to further elongate the hinge 15 used in the sixth embodiment.

Figure 34:
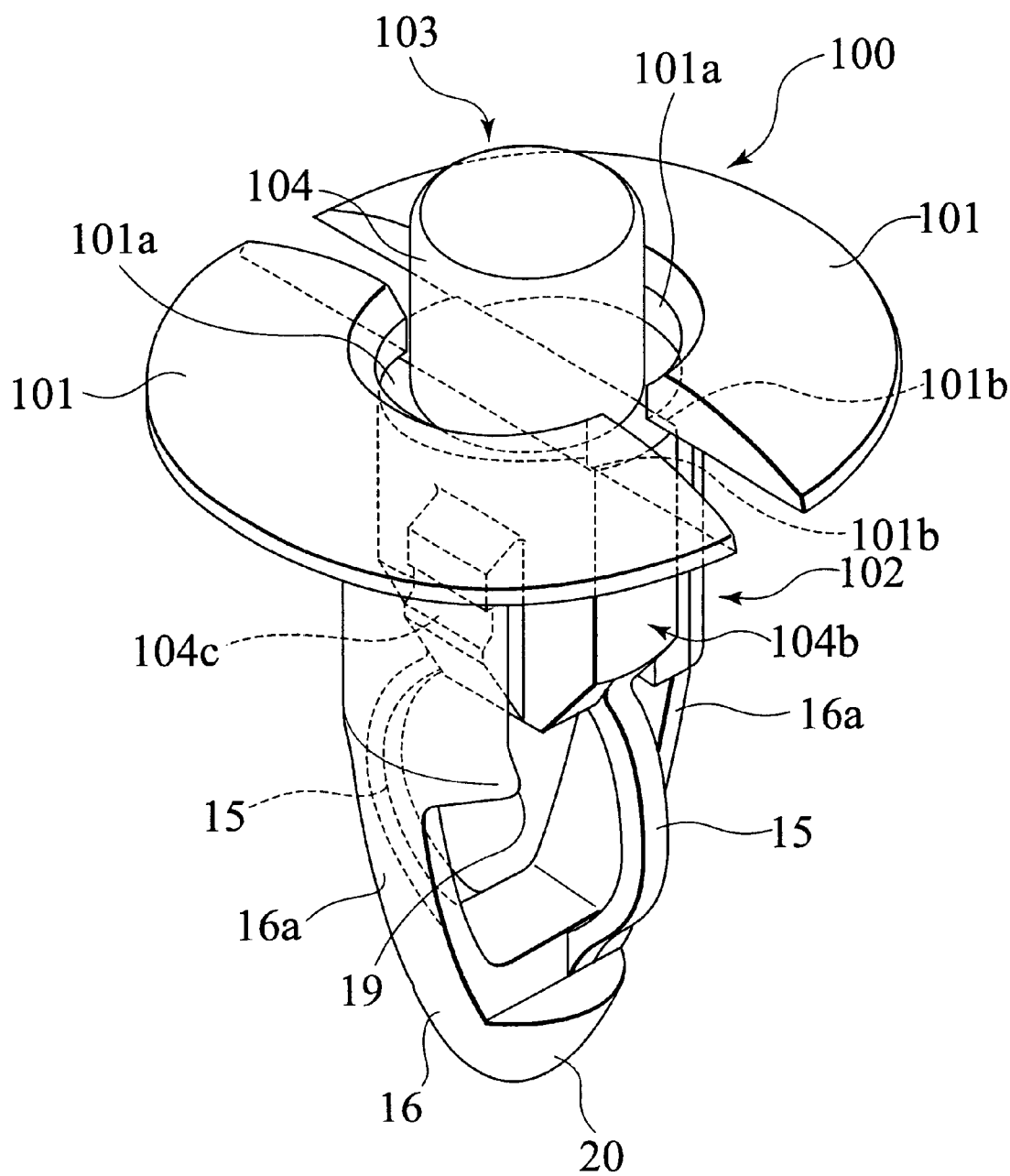
FIG. 34 is a perspective view of the clip according to the sixth embodiment of the invention.
Figure 35:
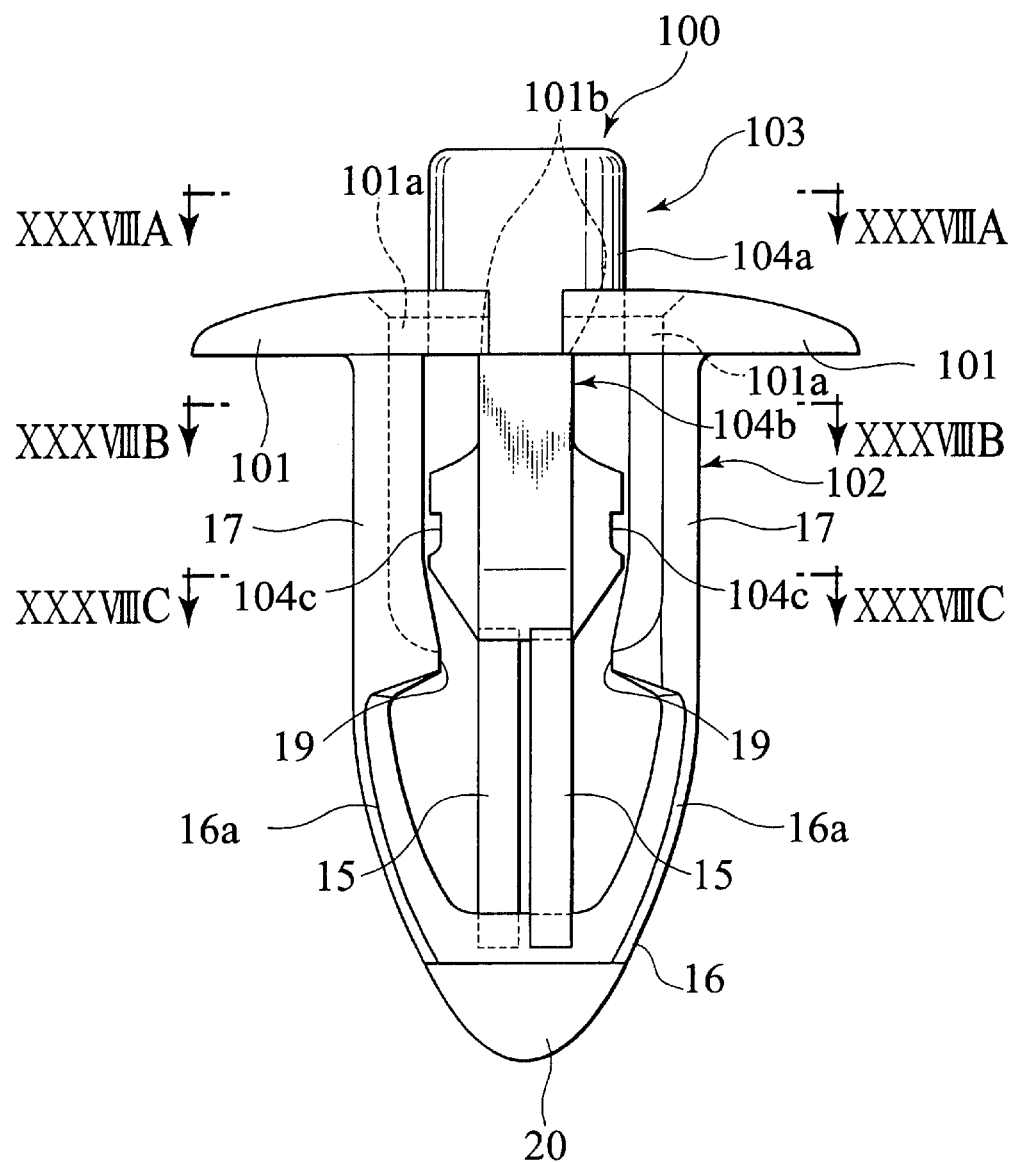
FIG. 35 is a front view of the clip shown in FIG. 34.
Figure 36:
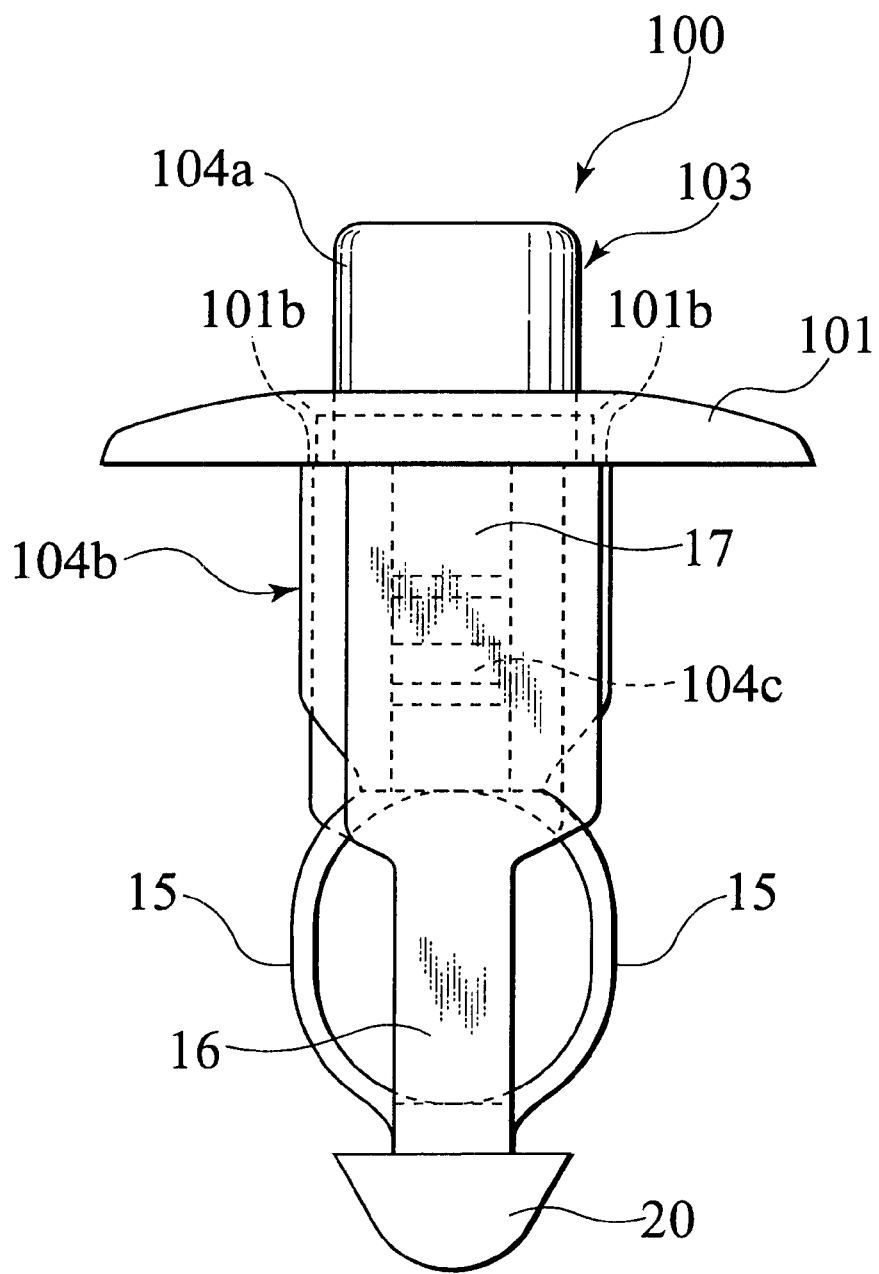
FIG. 36 is a side view of the clip shown in FIG. 34.
Figure 37:
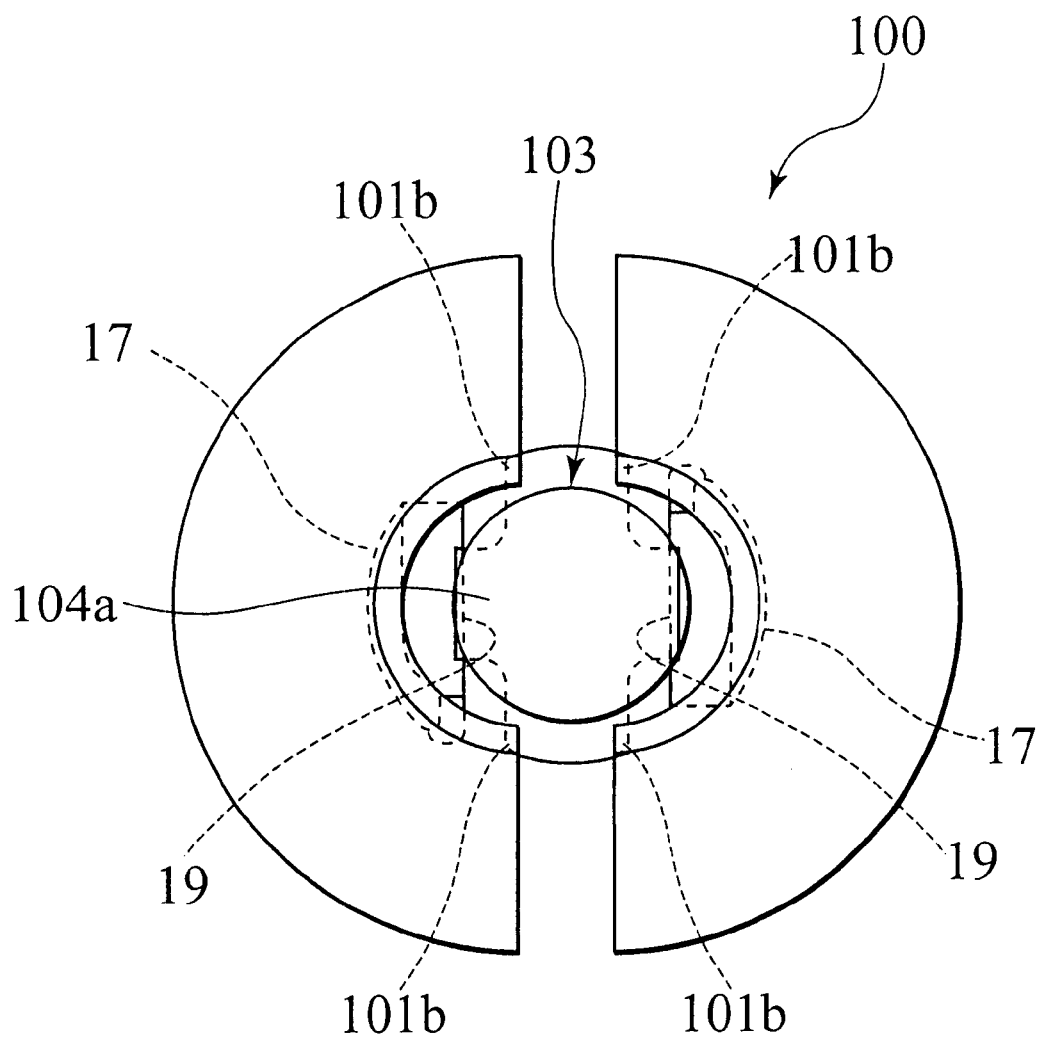
FIG. 37 is a plan view of the clip shown in FIG. 34.

The grommet 102 has semicircular flanges 101 extending horizontally from the top end of the half barrels 17, as illustrated in FIGS. 34 and 37. Each semicircular flange 101 has an indent 101a along the inner periphery so as to surround the pin 103. Both ends of the indent 101a of the semicircular flange 101 are coupled with the outer face of the pin 103 via a pair of bridges 101b. In other words, total of four bridges 101b are used to couple the semicircular flange 101 with the pin 103 before the clip 100 is used. The bridges 101b can maintain the pin 103 at a correct position relative to the grommet 102 in the unused state. The bridges 101b are cut off under a shear stress when the clip 100 is inserted into the holes 80 and 81 of the automobile panel 82 and the trim 83 in the actual use. The shear stress is generated during the insertion of the grommet 102 because the grommet 102 is compressed inward, bringing the leg pieces closer to each other.

In general, a stretching force in a laterally twisting direction easily affects a single-unit clip, in which a pin and a grommet having separate half barrels are integrally coupled with each other via hinges. In addition, the elastic leg pieces of the V-shaped leg are likely to be entangled with each other during shipping or transportation. The clip 100 of the sixth embodiment can overcome these problems in a conventional single-unit clip. Since the pin 103 is surrounded by the indents 101a of the semicircular flange 101, and since the pin 103 is kept in the correct position by the four bridges 101b that are connected to the grommet 102, the entirety of the clip 100 does not deform easily.

In addition, the tip of the spindle 104 of the pin 103 is coupled to the C-shaped hinges 15 that are arranged in planes perpendicular to the plane defined by the V-shaped leg 16, as in the first embodiment. With this arrangement, the pin 103 is supported at both the top and the bottom ends, which prevents the pin 103 from shaking or vibrating in the lateral direction. As a result, the grommet 102 can be smoothly inserted into the holes of the panel and trim. Holding the pin 103 at a right position allows a number of clips to be kept in order during shipping and transportation.

As has already been explained, the bridges 101*b* are cut off when the pin 103 is pushed into the grommet 102. Because the bridges are provided at both ends of the indent 101*a* of each semicircular flange 101, the remaining pieces of the bridges will not prevent the insertion of the pin 103 even after the bridges are cut off.

Figure 38A:
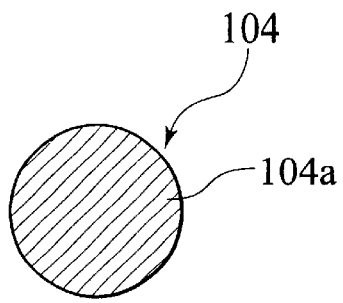
FIG. 38 illustrates horizontal cross-sectional views of several portions of the clip shown in FIG. 35, where FIG. 38(*a*) is the cross-section taken along the A—A line, FIG. 38(*b*) is the cross-section taken along the B—B line, and FIG. 38(*c*) is the cross-section taken along the C—C-line shown in FIG. 35.
Figure 38B:
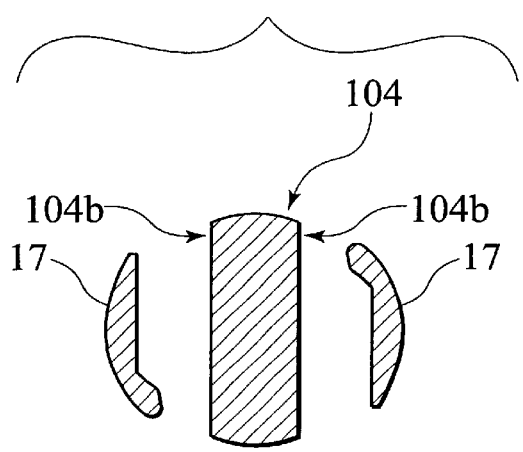
Figure 38C:
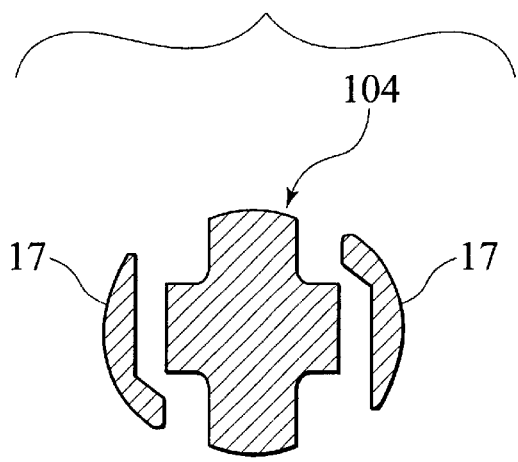

FIG. 38 illustrates horizontal cross-sectional views of the pin 103 at different positions. As illustrated in FIG. 38(*a*), the top 104*a* of the spindle 104 is formed cylindrical, unlike the pin 13 of the first embodiment. The middle portion 104*b* of the spindle 104 extending below the top 104*a* is chamfered vertically, so that the spindle 104 is indented. Accordingly, the horizontal cross-section of the middle portion 104*b* becomes rectangular, as shown in FIG. 38(*b*). The bottom portion of the spindle 104 has a horizontal cross-section of a cross, as shown in FIG. 38(*c*), and has grooves 104*c* for receiving the protrusions 19 formed in the inner faces of the half barrels 17. The C-shaped hinges 15 extend from the lower end of the spindle 104 to the bottom 20 of the V-shaped leg 16.

Figure 42:
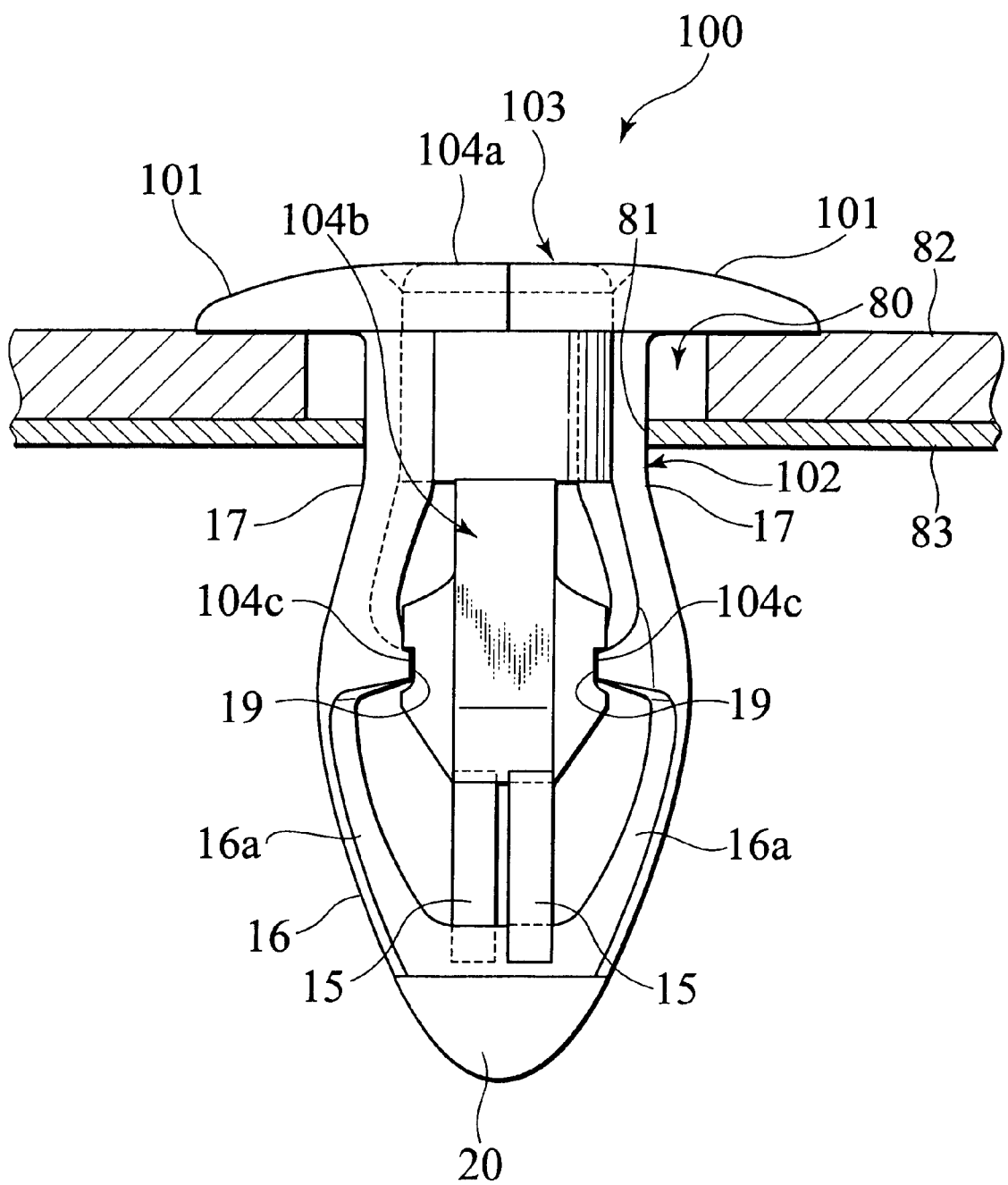
FIG. 42 illustrates a clip of the sixth embodiment that is finally fixed into the hole with the pin completely inserted into the grommet.

The pin 103 is designed so that the top face of the spindle 104 aligns with the top faces of the semicircular flanges 101, as illustrated in FIG. 42, when the protrusions 19 of the grommet 102 are fit into the grooves 104*c* of the spindle 104. In other words, the pin 103 has such a height above the top face of the semicircular flanges 101 in the unused state that corresponds to the distance from the groove 104 to the protrusion 19.

Figure 39:
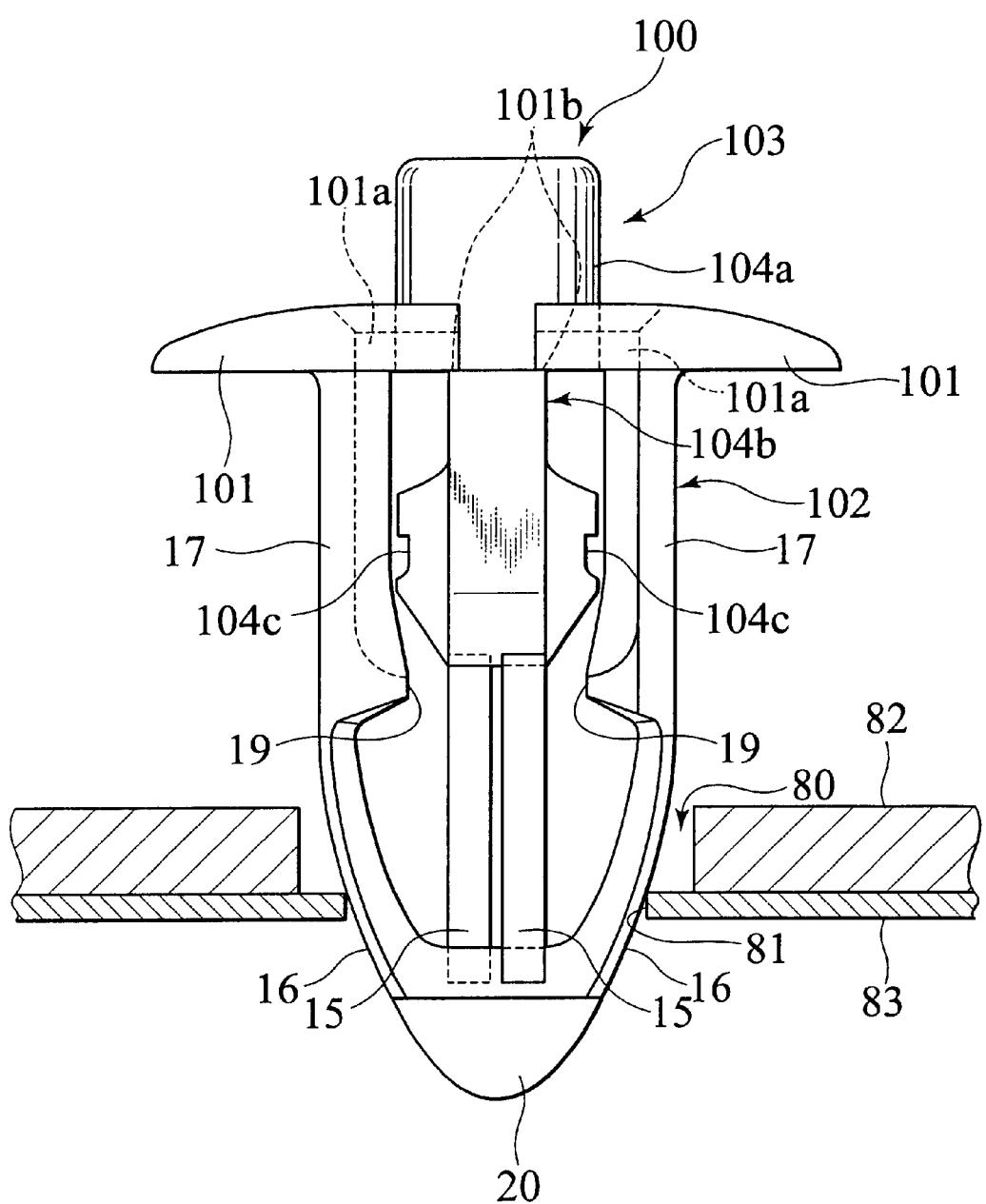
FIG. 39 illustrates the initial state of the clip of the sixth embodiment, the tip of which has just been inserted into the holes formed in the panel and the trim, respectively.
Figure 40:
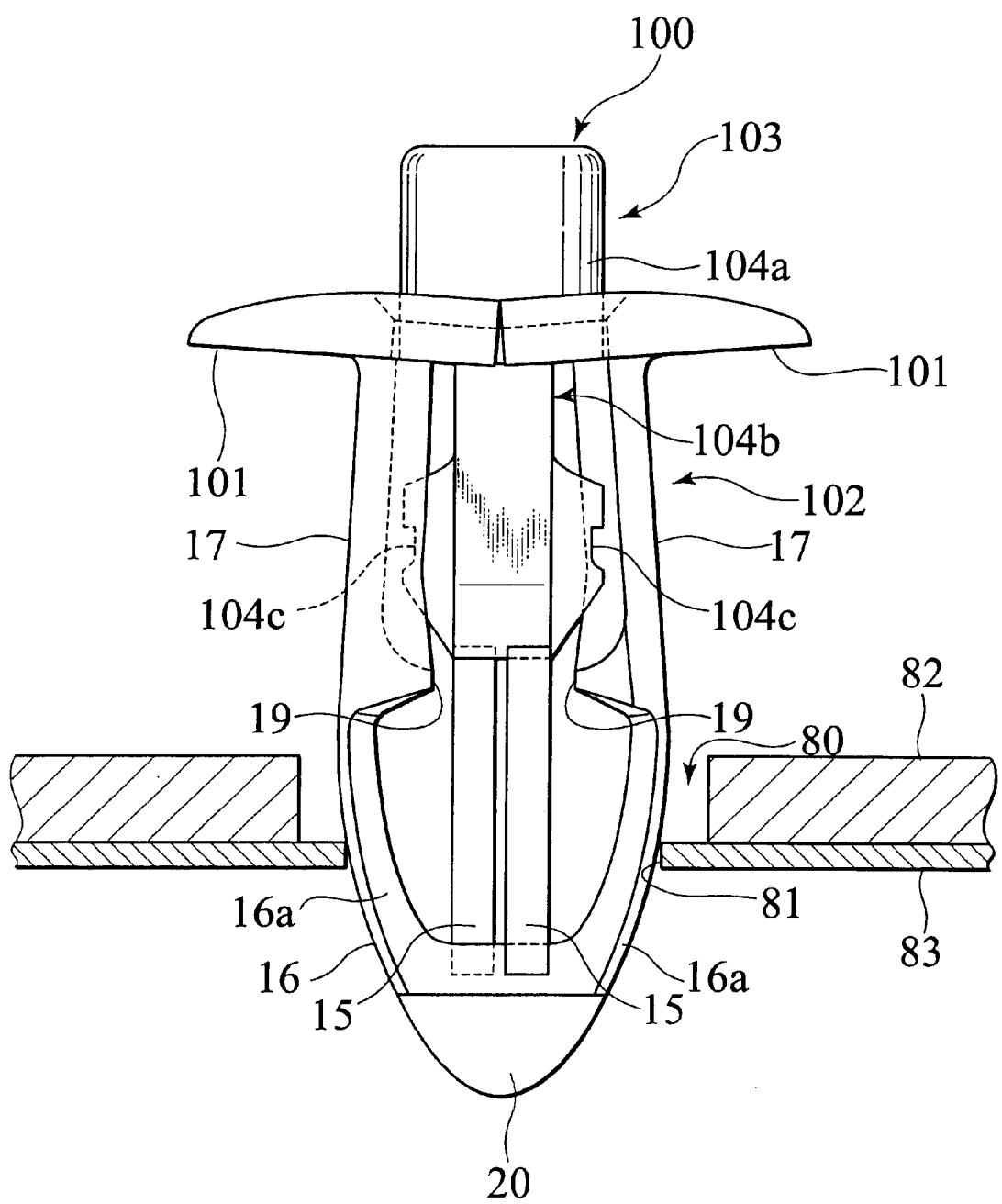
FIG. 40 illustrates a clip of the sixth embodiment that is further inserted in the hole of the trim with the bridges cut off under the shear stress.

When using the clip 100 to hold the body panel 82 and the trim 83 together, the bottom of the V-shaped leg 16 is inserted into the holes 80 and 81 with the grommet 102 pressed inward, as illustrated in FIG. 39. If the grommet 102 is further inserted in the holes, the elastic leg pieces 16*a* of the V-shaped leg 16 are pressed against the edges of the hole 81 of the trim 83, and the semicircular flanges 101 pivot upward, as illustrated in FIG. 40. The pivoting motion of the semicircular flanges 101 generate a shear stress, which causes the bridges 101*b* that connect the semicircular flanges 101 with the spindle 104 to be cut off. As a result, the pin 103 becomes movable in the axial direction, and is pushed into the grommet 102.

Figure 41:
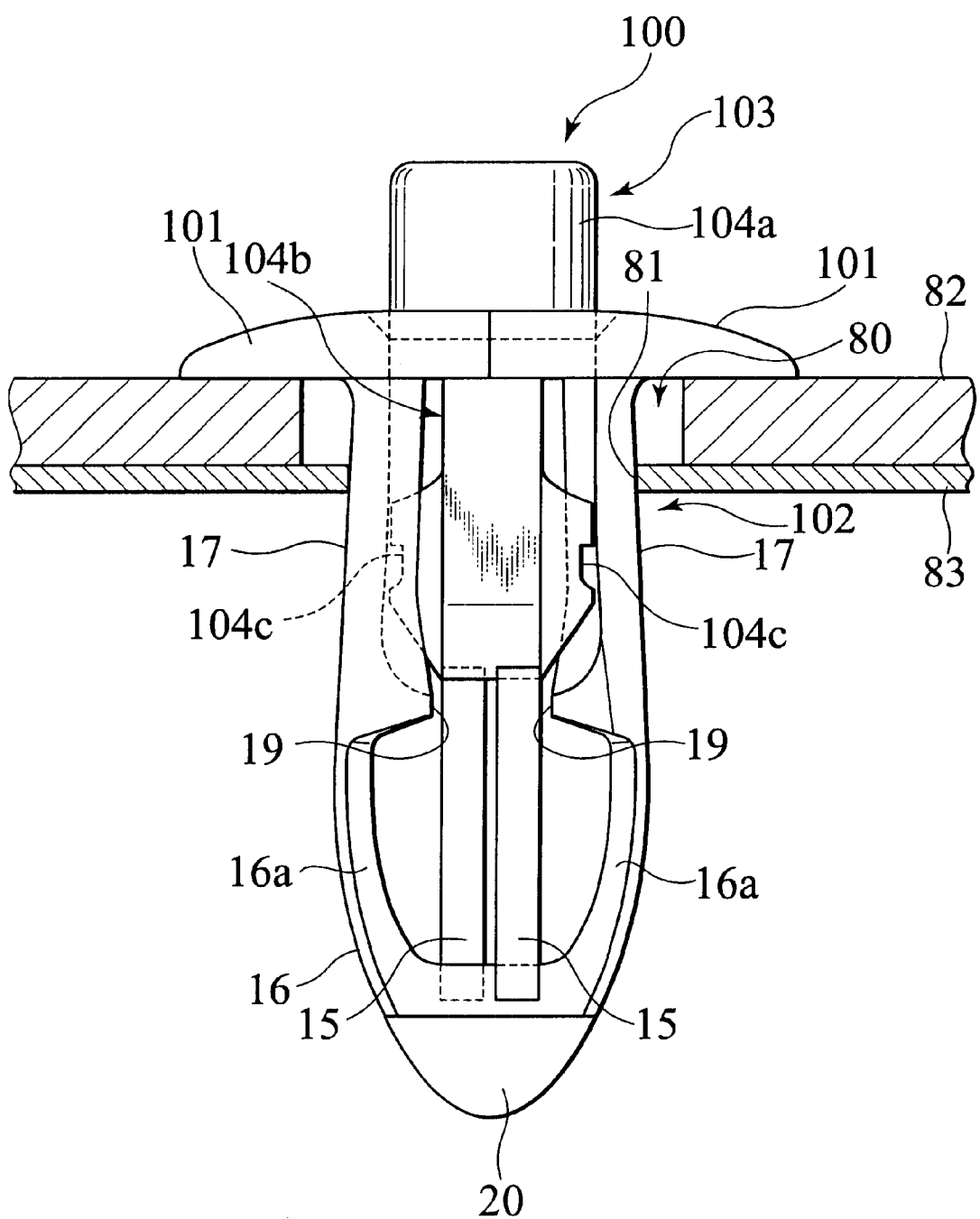
FIG. 41 illustrates a clip of the sixth embodiment that is still further inserted in the hole until the semicircular stoppers reach the panel face.

Then, the head of the pin 103 is further pushed into the grommet 102, as illustrated in FIG. 41, the spindle 104 of the pin 103 advances into the space between the V-shaped leg 16. As the pin 103 advances, the hinges 15 are bending more outward. Since the C-shaped hinges 15 have a sufficient length and flexibility, the pin 103 can be inserted smoothly without vibrating and without requiring an extra force against the reaction of the hinges 15. In other words, the pin 103 is inserted into the hole without being affected by the bending hinges 15.

If the spindle 104 of the pin 103 further advances between the V-shaped leg 16, the half barrels 17 of the grommet 102 are pressed inward by the edges of the hole 81 of the trim 83. Then, the protrusions 19 formed in the inner faces of the half barrels 17 are fit into the groove 104*c* of the spindle 104, as illustrated in FIG. 42. In this state, the grommet 102 and the pin 103 are engaged with each other. This engagement causes the grommet 102 to swell outward, and the V-shaped leg 16 functions as an anchor. Consequently, the panel 82 and the trim 83 are firmly held by the clip 100. Even if an external force is applied to the pin 103 in a direction of removing the pin 103, the swelling grommet 102 prevents the clip 100 from being removed from the holes. The C-shaped hinges 15 connecting the pin 103 with the grommet 102 will not push the pin 103 up because the reaction force of the C-shaped hinges 15 are sufficiently small with flexibility.

Figure 43:
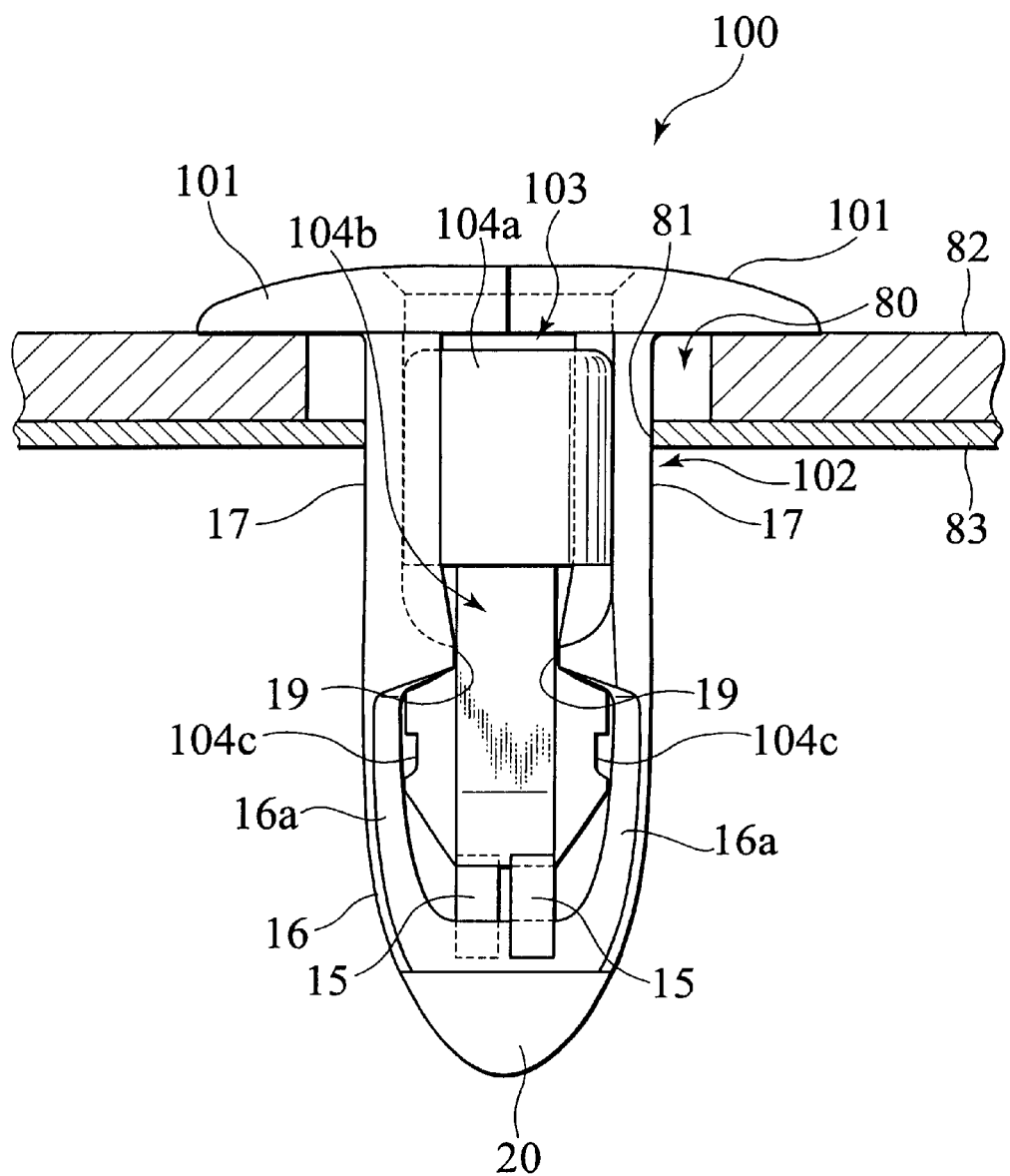
FIG. 43 illustrates a clip of the sixth embodiment, in which the pin is further pushed into the grommet in order to disengage the projection formed on the inner face of the grommet from the grooves of the spindles prior to removing the clip from the panel.
Figure 44:
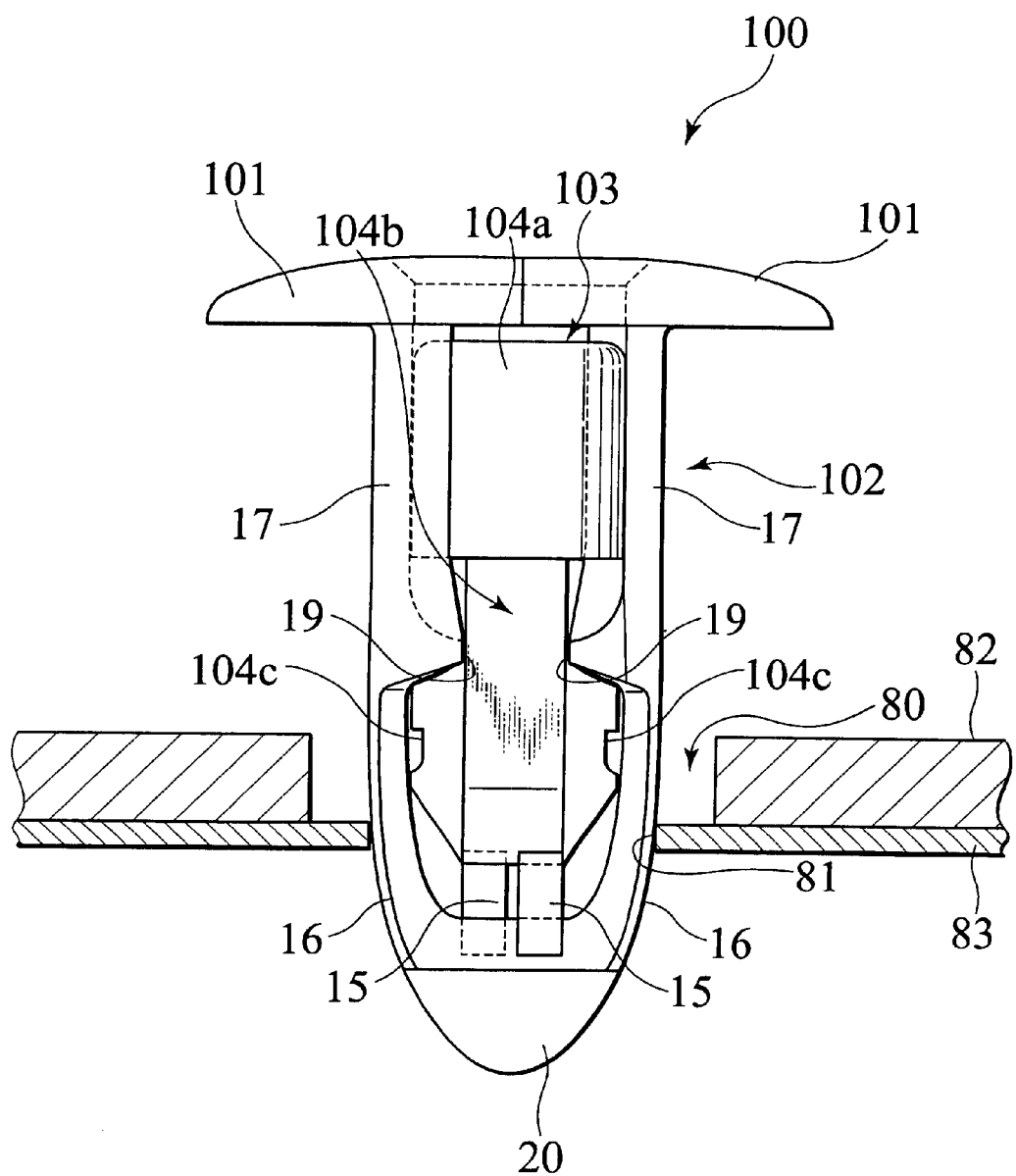
FIG. 44 illustrates a clip of the sixth embodiment that is being removed from the holes.

To release the engagement between the pin 103 and the grommet 102, the pin 103 is further pushed down using, for example, a screwdriver, so that the top face of the pin 103 lowers below the top faces of the semicircular flanges 101, as illustrated in FIG. 43. As the spindle 104 goes down, and the grooves 104 of the spindle 104 are disengaged from the protrusions 19 of the grommet 102. Once the engagement between the pin 103 and the grommet 102 is released, the indented middle portion 104*b* of the spindle 104 catches the protrusions 19. As a result, the elastic leg pieces 16*a* of the V-shaped leg 16 are brought closer to each other, and the entirety of the grommet 102 becomes thin. This operation causes the size of the grommet 102 to become smaller than the size of the hole 81 of the trim 83, and allows the clip 100 to be removed smoothly from the hole 81 without damaging the edges of the hole 81.

As has been described above, a single-unit clip 100, in which a grommet and a pin are coupled with hinges, can have a mechanical strength, while maintaining the hinges flexible. Even if the hinges are made of a relatively hard material for purposes of guaranteeing a mechanical strength, they will still be flexible enough not to break and not to apply undesirable load on insertion of the pin.

Although the present invention has been described based on the preferred examples, the invention will not be limited to these examples. It should be appreciated that there are many modifications and substitutions without departing from the scope of the invention, which are defined by the appended claims.

What is claimed is:

1. A clip for holding two or more materials together, comprising:
   a grommet having a V-shaped leg portion,
   the V-shaped leg portion having a pair of leg pieces and a bottom connecting the leg pieces;
   a pin movable in the axial direction in a space in the V-shaped leg portion;
   and a pair of hinges coupling the pin with the V-shaped leg portion of the grommet, the hinges extending in planes not parallel to a plane defined by the longitudinal axes of the leg pieces of the V-shaped leg portion.

2. The clip of claim 1, wherein the hinges are arranged in an alternate manner with respect to the plane defined by the longitudinal axis of the leg pieces.

3. The clip of claim 1, wherein the hinges are arranged in planes perpendicular to the plane defined by the longitudinal axis of the leg pieces.

4. The clip of claim 1, wherein the hinges are curved before the clip is actually used.

5. The clip of claim 4, wherein the hinges are C-shaped, and couple the pin with the bottom of the V-shaped leg portion.

6. The clip of claim 4, wherein the hinges are twisted in alternate directions, and couple the pin with an edge of each leg piece of the V-shaped leg portion.

7. The clip of claim 1, wherein the grommet has a pair of half barrels extending from the top ends of the V-shaped leg portion and facing each other with the pin between them, and a pair of flanges extending horizontally from a top end of the half barrels.

8. The clip of claim 7, wherein each of the half barrels has a protrusion on an inner face, and the pin has grooves, and wherein the protrusions are fit into the grooves when the pin is pushed into the V-shaped leg portion of the grommet.

9. The clip of claim 1, wherein the grommet has a pair of semicircular flanges above the V-shaped leg portion, and bridges for coupling of each semicircular flange with the pin.

10. The clip of claim 9, wherein the bridges are broken when the pin is pushed into the grommet.

11. The clip of claim 1, wherein the grommet, the pin, and the hinges are formed as a single unit from a polyacetal resin.

12. The clip of claim 11, wherein the bottom of the V-shaped leg portion is made thicker than the average thickness of each of the leg pieces.

13. A clip for holding two or more materials together, comprising:
   a grommet having a V-shaped leg portion;
   a pin movable in the axial direction in a space in the V-shaped leg portion;
   a pair of hinges coupling the pin with the V-shaped leg portion of the grommet, the hinges being curves in the free state before the clip is actually used.

14. A clip for holding two or more materials together, comprising:
   a grommet having a V-shaped leg portion;
   a pin being movable in the axial direction in a space in the V-shaped leg portion; and
   a single curved hinge coupling the pin with the V-shaped leg portion of the grommet.

15. The clip of claim 14, wherein the hinge is S-shaped.

16. The clip of claim 14, wherein the V-shaped leg portion has a pair of leg pieces and a bottom connecting the leg pieces, and wherein a longitudinal axis of the curved hinge extends in a plane perpendicular to a plane defined by a longitudinal axis of the leg pieces.

17. A clip for holding two or more materials together, comprising:
   a grommet having a V-shaped leg portion, the V-shaped leg portion having a pair of leg pieces and a bottom connecting the leg pieces;
   a pin movable in the axial direction in a space in the V-shaped leg portion;
   a pair of hinges coupling the pin with the bottom of the V-shaped leg portion of the grommet.

18. The clip of claim 17, wherein the bottom of the V-shaped leg portion is made thicker than the average thickness of each of the leg pieces.

19. The clip of claim 17, wherein the grommet, the pin, and the hinges are formed as a single unit from a polyacetal resin.

* * * * *